United States Patent
Hu et al.

(10) Patent No.: US 11,627,458 B2
(45) Date of Patent: Apr. 11, 2023

(54) KEY DERIVATION ALGORITHM NEGOTIATION METHOD AND APPARATUS

(71) Applicant: HUAWEI TECHNOLOGIES CO., LTD., Shenzhen (CN)

(72) Inventors: Li Hu, Shanghai (CN); Jing Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 473 days.

(21) Appl. No.: 16/821,103

(22) Filed: Mar. 17, 2020

(65) Prior Publication Data

US 2020/0221297 A1    Jul. 9, 2020

Related U.S. Application Data

(63) Continuation of application No. PCT/CN2018/100848, filed on Aug. 16, 2018.

(30) Foreign Application Priority Data

Sep. 27, 2017  (CN) .......................... 201710890306.2
Mar. 28, 2018  (CN) .......................... 201810265796.1

(51) Int. Cl.
*H04L 29/06*   (2006.01)
*H04W 12/041*  (2021.01)

(52) U.S. Cl.
CPC ................................. *H04W 12/041* (2021.01)

(58) Field of Classification Search
CPC . H04W 12/041; H04W 12/069; H04W 12/04; H04L 2209/80; H04L 9/0869;

(Continued)

(56) References Cited

U.S. PATENT DOCUMENTS

2006/0085348 A1   4/2006 Alda et al.
2013/0290719 A1  10/2013 Kaler et al.
(Continued)

FOREIGN PATENT DOCUMENTS

CN   103313239 A   9/2013
CN   104661217 A   5/2015
(Continued)

OTHER PUBLICATIONS

Huawei et al.,"A solution for KDF negotiation between UE and ARPF",3GPP TSG SA WG3 (Security) Meeting #85 S3-161679, Nov. 7, 2016 Santa Cruz de Tenerife (Spain),total 2 pages.

(Continued)

*Primary Examiner* — Kendall Dolly
(74) *Attorney, Agent, or Firm* — Rimon PC

(57) ABSTRACT

This application provides a key derivation algorithm negotiation method and an apparatus. The method includes: checking, by a terminal, a sent first key derivation algorithm and a received second key derivation algorithm; if the checking is correct and the first key derivation algorithm is the same as the second key derivation algorithm, determining that the first key derivation algorithm sent by the terminal is not tampered with by an attacker; and then using a negotiated third key derivation algorithm as a key derivation algorithm of the terminal, to ensure confidentiality of the negotiated key derivation algorithm, thereby improving communication security.

2 Claims, 14 Drawing Sheets

(58) Field of Classification Search
CPC ....... H04L 9/0891; H04L 9/16; H04L 9/3242; H04L 9/0838; H04L 9/0861; H04L 9/3213
See application file for complete search history.

(56) References Cited

U.S. PATENT DOCUMENTS

| | | | |
|---|---|---|---|
| 2015/0350119 | A1 | 12/2015 | Thirumalai et al. |
| 2016/0127896 | A1* | 5/2016 | Lee .................... H04W 12/0431 455/411 |
| 2016/0197909 | A1 | 7/2016 | Innes |
| 2016/0249210 | A1* | 8/2016 | Chang .................... H04L 69/14 |
| 2018/0199193 | A1 | 7/2018 | Lee et al. |

FOREIGN PATENT DOCUMENTS

| | | | |
|---|---|---|---|
| CN | 104935426 | A | 9/2015 |
| CN | 105139204 | A | 12/2015 |
| CN | 105306406 | A * | 2/2016 |
| CN | 105306406 | A | 2/2016 |
| CN | 106899562 | A * | 6/2017 |
| CN | 106899562 | A | 6/2017 |
| CN | 106922216 | A | 7/2017 |
| CN | 106936570 | A | 7/2017 |

OTHER PUBLICATIONS

3GPP TS 33.401 V15.1.0 (Sep. 1, 2017),3rd Generation Partnership Project;Technical Specification Group Services and System Aspects;3GPP System Architecture Evolution (SAE);Security architecture(Release 15), total 161 pages.

3GPP TR 33.899 V1.3.0 (Aug. 1, 2017),3rd Generation Partnership Project;Technical Specification Group Services and System Aspects;Study on the security aspects of the next generation system(Release 14), total 36 pages.

Vodafone,"Analysis of the authenticated GSM cipher command mechanism",3GPP TSG SA WG3 Security—SA3#33, S3-040262, May 10, 2004, Beijing, China, total 10 pages.

* cited by examiner

KEY DERIVATION ALGORITHM NEGOTIATION METHOD AND APPARATUS

CROSS-REFERENCE TO RELATED APPLICATIONS

This application is a continuation of International Application No. PCT/CN2018/100848, filed on Aug. 16, 2018, which claims priority to Chinese Patent Application No. 201710890306.2, filed on Sep. 27, 2017 and Chinese Patent Application No. 201810265796.1, filed on Mar. 28, 2018. The disclosures of the aforementioned applications are hereby incorporated by reference in their entireties.

TECHNICAL FIELD

This application relates to the field of mobile communications technologies, and in particular, to a key derivation algorithm negotiation method and an apparatus.

BACKGROUND

A security algorithm can include an integrity protection algorithm, an encryption algorithm, and a Key Derivation Function (KDF) algorithm. The KDF algorithm is also referred to as a key derivation algorithm. The integrity protection algorithm is used to compute a Message Authentication Code (MAC). The encryption algorithm is used to encrypt a message. The KDF algorithm is used to derive a key.

Currently, for the KDF algorithm, a negotiation method between a terminal and a network side is that the terminal sends key derivation algorithms supported by the terminal to the network side, the network side selects, based on a preconfigured policy such as a priority policy, one key derivation algorithm from the key derivation algorithms to send to the terminal, and the selected key derivation algorithm is used as the negotiated key derivation algorithm.

A main disadvantage of the foregoing method is that an initial message sent by the terminal to the network side is vulnerable to an attacker due to lack of integrity protection. For example, the attacker can modify the key derivation algorithm that is sent by the terminal to the network side and that is supported by the terminal, so that the network side receives only one, less secure key, derivation algorithm, and the network side selects the less secure key derivation algorithm to send to the terminal as the negotiated key derivation algorithm. Consequently, the terminal and the network side use the less secure key derivation algorithm, and communication security is lowered.

SUMMARY

This application provides a key derivation algorithm negotiation method and an apparatus, to improve communication security.

According to a first aspect, this application provides a key derivation algorithm negotiation method, and the method may be performed by a terminal or a chip in a terminal. The method includes: sending, by a terminal, a first key derivation algorithm to a storage function entity, where the first key derivation algorithm is at least one key derivation algorithm supported by the terminal; receiving, by the terminal, an authentication token from the storage function entity, where the authentication token includes a first message authentication code, a second key derivation algorithm, and a third key derivation algorithm, the second key derivation algorithm is at least one key derivation algorithm that is received by the storage function entity and that is supported by the terminal, the second key derivation algorithm includes the third key derivation algorithm, and the first message authentication code is generated based on the second key derivation algorithm; generating, by the terminal, a second message authentication code based on the second key derivation algorithm; and obtaining, by the terminal, the third key derivation algorithm as a key derivation algorithm of the terminal if the first message authentication code is the same as the second message authentication code, and the first key derivation algorithm is the same as the second key derivation algorithm.

In this application, the terminal checks the sent first key derivation algorithm and the received second key derivation algorithm. If the checking is correct and the first key derivation algorithm is the same as the second key derivation algorithm, the terminal determines that the first key derivation algorithm sent by the terminal has not been tampered with by an attacker and uses the negotiated third key derivation algorithm as a key derivation algorithm of the terminal, to ensure confidentiality of the negotiated key derivation algorithm, thereby improving communication security.

In a possible design, the second key derivation algorithm is carried in an authentication management field (AMF) of the authentication token.

According to a second aspect, this application provides a key derivation algorithm negotiation method, and the method may be performed by a storage function entity or a chip in a storage function entity. The storage function entity may be a Home Subscriber Server (HSS), a Unified Data Management (UDM) entity, an Authentication Credential Repository and Processing Function (ARPF) entity, or the like. The method includes:

receiving, by a storage function entity, a second key derivation algorithm, where the second key derivation algorithm is at least one key derivation algorithm that is received by the storage function entity and that is supported by a terminal; selecting, by the storage function entity based on a preset policy, a third key derivation algorithm from the second key derivation algorithm, and generating a first message authentication code based on the second key derivation algorithm; and sending, by the storage function entity, an authentication token to the terminal, where the authentication token includes the first message authentication code, the third key derivation algorithm, and the second key derivation algorithm.

In a possible design, the second key derivation algorithm is carried in an AMF of the authentication token.

According to a third aspect, this application provides a key derivation algorithm negotiation method, and the method may be performed by a terminal or a chip in a terminal. The method includes: sending, by a terminal, a first message to a mobility management function entity if a first key derivation algorithm is different from a second key derivation algorithm, where the first message includes the first key derivation algorithm, the first key derivation algorithm is at least one key derivation algorithm supported by the terminal, and the second key derivation algorithm is at least one key derivation algorithm that is received by the mobility management function entity or a storage function entity and that is supported by the terminal; receiving, by the terminal, a second message from the mobility management function entity, where the second message includes a target key derivation algorithm, and the first key derivation algorithm includes the target key derivation algorithm; and updating, by the terminal, a key derivation algorithm of the terminal to the target key derivation algorithm, and updating a key of the terminal based on the target key derivation algorithm.

If the first key derivation algorithm is different from the second key derivation algorithm, it is determined that the first key derivation algorithm sent by the terminal is tampered with, so that the first key derivation algorithm is resent by using the first message. In this case, because the sent first message is not an initial message, the first message may be integrity protected against attack by an attacker. Therefore, when receiving the target key derivation algorithm, the terminal does not need to perform checking, but directly updates the key derivation algorithm of the terminal to the target derivation algorithm, to complete a negotiation on the key derivation algorithm, and ensure confidentiality of the negotiated key derivation algorithm, thereby improving communication security.

In a possible design, the target key derivation algorithm includes a first target key derivation algorithm from the storage function entity; and the updating, by the terminal, a key of the terminal based on the target key derivation algorithm includes: updating, by the terminal, an access security management entity key of the terminal based on the first target key derivation algorithm.

In this method, the terminal further updates the key of the terminal based on the first target key derivation algorithm selected by the storage function entity, for example, the access security management entity key, to ensure communication security.

In a possible design, the second message further includes a first random number from the storage function entity; and the updating, by the terminal, an access security management entity key of the terminal based on the first target key derivation algorithm includes: updating, by the terminal, the access security management entity key based on the first target key derivation algorithm and the first random number.

In a possible design, the target key derivation algorithm includes a second target key derivation algorithm from the mobility management function entity; and the updating, by the terminal, a key of the terminal based on the target key derivation algorithm includes: updating, by the terminal based on the second target key derivation algorithm, a first key used for communication between the terminal and the mobility management function entity.

In this method, the terminal further updates the key of the terminal based on the second target key derivation algorithm selected by the mobility management function entity, for example, the first key used for communication between the terminal and the mobility management function entity, to ensure communication security.

In a possible design, the second message further includes a second random number from the mobility management function entity; and the updating, by the terminal based on the second target key derivation algorithm, a first key used for communication between the terminal and the mobility management function entity includes: updating, by the terminal, the first key based on the second target key derivation algorithm and the second random number.

In a possible design, the method further includes: receiving, by the terminal, a Non-Access Stratum (NAS) security mode complete (SMP) message from the mobility management function entity, where the NAS SMP message includes the second key derivation algorithm; and determining, by the terminal, that the first key derivation algorithm is different from the second key derivation algorithm.

In a possible design, the first message is the NAS SMP message, and the second message is a NAS security mode command (SMC) message. When the first message is the NAS SMP message, the first message may be integrity protected, so that it may be ensured that the first key derivation algorithm in the first message is not tampered with by an attacker, thereby ensuring communication security.

According to a fourth aspect, this application provides a key derivation algorithm negotiation method, and the method may be performed by a storage function entity or a chip in a storage function entity, or may be performed by a mobility management function entity or a chip in a mobility management function entity. The storage function entity may be an HSS, a UDM, or an ARPF, and the mobility management function entity may be a Mobility Management Entity (MME), an Access and Mobility Management Function (AMF) entity, or the like. The method includes: receiving, by a network side node, a first key derivation algorithm from a terminal, where the first key derivation algorithm is at least one key derivation algorithm supported by the terminal; selecting, by the network side node, a target key derivation algorithm from the first key derivation algorithm based on a preset policy; updating, by the network side node, a key stored in the network side node based on the target key derivation algorithm; and sending, by the network side node, the target key derivation algorithm to the terminal.

In a possible design, the updating, by the storage function entity, a key stored in the network side node based on the target key derivation algorithm includes: generating, by the network side node, a random number; updating, by the network side node, the key stored in the network side node based on the random number and the target key derivation algorithm; and sending, by the network side node, the random number to the terminal.

In a possible design, the network side node is a mobility management function entity, and the key stored in the network side node is an access security management entity key of the terminal. Alternatively, the network side node is a storage function entity, and the key stored in the network side node is a first key used for communication between the terminal and the mobility management function entity.

In a possible design, the network side node is a mobility management function entity, and before the receiving, by a network side node, a first key derivation algorithm from a terminal, the method further includes: receiving, by the mobility management function entity, a second key derivation algorithm, where the second key derivation algorithm is at least one key derivation algorithm that is received by the mobility management function entity and that is supported by the terminal; and sending, by the mobility management function entity, a non-access stratum (NAS) security mode complete SMC message to the terminal, where the NAS SMC message includes the second key derivation algorithm.

According to a fifth aspect, this application provides an apparatus, and the apparatus may be a terminal, or may be a chip in a terminal. The apparatus has functions of implementing the embodiments according to the first aspect. The function may be implemented by using hardware, or may be implemented by hardware executing corresponding software. The hardware or the software includes one or more modules corresponding to the foregoing functions.

In a possible design, when the apparatus is the terminal, the terminal includes a processing unit and a communications unit. The processing unit may be, for example, a processor. The communications unit may be, for example, a transceiver, and the transceiver includes a radio frequency circuit. Optionally, the terminal further includes a storage unit, and the storage unit may be, for example, a memory. When the terminal includes the storage unit, the storage unit stores a computer-executable instruction, the processing unit is connected to the storage unit, and the processing unit executes the computer-executable instruction stored in the storage unit, so that the terminal performs the key derivation algorithm negotiation method according to any one of the possible designs of the first aspect.

In another possible design, when the apparatus is the chip in the terminal, the chip includes a processing unit and a communications unit. The processing unit may be, for example, a processor. The communications unit may be, for example, an input/output interface, a pin, or a circuit. The processing unit may execute the computer-executable instruction stored in the storage unit, so that the key derivation algorithm negotiation method according to any one of the possible designs of the first aspect is performed. Optionally, the storage unit is a storage unit in the chip, for example, a register or a cache. The storage unit may alternatively be a storage unit that is in the terminal and that is outside the chip, for example, a read-only memory ROM), another type of static storage device that can store static information and an instruction, or a random access memory (RAM).

The processor mentioned in any one of the foregoing possible designs may be a general purpose Central Processing Unit (CPU), a microprocessor, an application-specific integrated circuit (ASIC), or one or more integrated circuits that are configured to control execution of a program of the key derivation algorithm negotiation method according to the first aspect.

According to a sixth aspect, this application provides an apparatus, and the apparatus may be a storage function entity, or may be a chip in a storage function entity. The storage function entity may be an HSS, a UDM, an ARPF, or the like. The apparatus has functions of implementing the embodiments according to the second aspect. The function may be implemented by using hardware, or may be implemented by hardware executing corresponding software. The hardware or the software includes one or more modules corresponding to the foregoing functions.

In a possible design, when the apparatus is the storage function entity, the storage function entity includes a processing unit and a communications unit. The processing unit may be, for example, a processor. The communications unit may be, for example, a transceiver, and the transceiver includes a radio frequency circuit. Optionally, the storage function entity further includes a storage unit, and the storage unit may be, for example, a memory. When the storage function entity includes the storage unit, the storage unit stores a computer-executable instruction, the processing unit is connected to the storage unit, and the processing unit executes the computer-executable instruction stored in the storage unit, so that the storage function entity performs the key derivation algorithm negotiation method according to any one of the possible designs of the second aspect.

In another possible design, when the apparatus is the chip in the storage function entity, the chip includes a processing unit and a communications unit. The processing unit may be, for example, a processor. The communications unit may be, for example, an input/output interface, a pin, or a circuit. The processing unit may execute the computer-executable instruction stored in the storage unit, so that the key derivation algorithm negotiation method according to any one of the possible designs of the second aspect is performed. Optionally, the storage unit is a storage unit in the chip, for example, a register or a cache. The storage unit may alternatively be a storage unit that is in the storage function entity and that is outside the chip, for example, a ROM, another type of static storage device that can store static information and an instruction, or a RAM.

The processor mentioned in any one of the foregoing possible designs may be a general-purpose CPU, a microprocessor, an ASIC, or one or more integrated circuits that are configured to control execution of a program of the key derivation algorithm negotiation method according to the second aspect.

According to a seventh aspect, this application provides an apparatus, and the apparatus may be a terminal, or may be a chip in a terminal. The apparatus has functions of implementing the embodiments according to the third aspect. The function may be implemented by using hardware, or may be implemented by hardware executing corresponding software. The hardware or the software includes one or more modules corresponding to the foregoing functions.

In a possible design, when the apparatus is the terminal, the terminal includes a processing unit and a communications unit. The processing unit may be, for example, a processor. The communications unit may be, for example, a transceiver, and the transceiver includes a radio frequency circuit. Optionally, the terminal further includes a storage unit, and the storage unit may be, for example, a memory. When the terminal includes the storage unit, the storage unit stores a computer-executable instruction, the processing unit is connected to the storage unit, and the processing unit executes the computer-executable instruction stored in the storage unit, so that the terminal performs the key derivation algorithm negotiation method according to any one of the possible designs of the third aspect.

In another possible design, when the apparatus is the chip in the terminal, the chip includes a processing unit and a communications unit. The processing unit may be, for example, a processor. The communications unit may be, for example, an input/output interface, a pin, or a circuit. The processing unit may execute the computer-executable instruction stored in the storage unit, so that the key derivation algorithm negotiation method according to any one of the possible designs of the third aspect is performed. Optionally, the storage unit is a storage unit in the chip, for example, a register or a cache. The storage unit may alternatively be a storage unit that is in the terminal and that is outside the chip, for example, a ROM, another type of static storage device that can store static information and an instruction, or a RAM.

The processor mentioned in any one of the foregoing possible designs may be a general-purpose CPU, a microprocessor, an ASIC, or one or more integrated circuits that are configured to control execution of a program of the key derivation algorithm negotiation method according to the third aspect.

According to an eighth aspect, this application provides an apparatus, and the apparatus may be a storage function entity, or may be a chip in a storage function entity. The storage function entity may be an HSS, a UDM, an ARPF, or the like. The apparatus has functions of implementing the embodiments according to the fourth aspect. The function may be implemented by using hardware, or may be implemented by hardware executing corresponding software. The hardware or the software includes one or more modules corresponding to the foregoing functions.

In a possible design, when the apparatus is the storage function entity, the storage function entity includes a processing unit and a communications unit. The processing unit may be, for example, a processor. The communications unit may be, for example, a transceiver, and the transceiver includes a radio frequency circuit. Optionally, the storage function entity further includes a storage unit, and the storage unit may be, for example, a memory. When the storage function entity includes the storage unit, the storage unit stores a computer-executable instruction, the processing unit is connected to the storage unit, and the processing unit executes the computer-executable instruction stored in the storage unit, so that the storage function entity performs the key derivation algorithm negotiation method according to any one of the possible designs of the fourth aspect.

In another possible design, when the apparatus is the chip in the storage function entity, the chip includes a processing unit and a communications unit. The processing unit may be, for example, a processor. The communications unit may be, for example, an input/output interface, a pin, or a circuit. The processing unit may execute the computer-executable instruction stored in the storage unit, so that the key derivation algorithm negotiation method according to any one of the possible designs of the fourth aspect is performed. Optionally, the storage unit is a storage unit in the chip, for example, a register or a cache. The storage unit may alternatively be a storage unit that is in the storage function entity and that is outside the chip, for example, a ROM, another type of static storage device that can store static information and an instruction, or a RAM.

The processor mentioned in any one of the foregoing possible designs may be a general-purpose CPU, a microprocessor, an ASIC, or one or more integrated circuits that are configured to control execution of a program of the key derivation algorithm negotiation method according to the fourth aspect.

According to a ninth aspect, this application provides a key derivation algorithm negotiation method, and the method may be performed by a terminal or a chip in a terminal. The method includes: sending, by a terminal, first identification information of a first key derivation algorithm to a network side network element, where the first key derivation algorithm is at least one key derivation algorithm supported by the terminal; receiving, by the terminal, second identification information of a second key derivation algorithm; and generating, by the terminal, a lower-layer key based on an upper-layer key, the first identification information, and the second key derivation algorithm.

In this application, the terminal sends the first identification information of the first key derivation algorithm to the network side network element, where the first key derivation algorithm may be tampered with in a sending process; and the terminal receives the second identification information of the second key derivation algorithm, where the second key derivation algorithm may be a key derivation algorithm selected by the network side network element, or may be a key derivation algorithm that has been tampered with. Further, the terminal generates the lower-layer key based on the upper-layer key, the first identification information, and the second key derivation algorithm. Because the first identification information of the first key derivation algorithm and the second key derivation algorithm are used when the lower-layer key is generated, if the first key derivation algorithm or the second key derivation algorithm is tampered with, the lower-layer key generated by the terminal is different from a lower-layer key generated by the network side network element, resulting in a communication failure. Only when the first key derivation algorithm and the second key derivation algorithm are not tampered with, a correct communication can be implemented, thereby improving the communication security.

In a possible design, the generating, by the terminal, a lower-layer key based on an upper-layer key, the first identification information, and the second key derivation algorithm includes: generating, by the terminal, the lower-layer key based on the upper-layer key, the first identification information, the second identification information, and the second key derivation algorithm.

In the foregoing method, the second identification information may further be used as an input parameter when the lower-layer key is generated.

In a possible design, the upper-layer key is a cipher key CK and an integrity key IK, and the lower-layer key is a security anchor key Kseaf; and the generating, by the terminal, a lower-layer key based on an upper-layer key, the first identification information, and the second key derivation algorithm includes: generating, by the terminal, an authentication service key Kausf based on the CK, the IK, the first identification information, and the second key derivation algorithm, and generating the Kseaf based on the Kausf and the second key derivation algorithm; or generating, by the terminal, a Kausf based on the CK, the IK, and the second key derivation algorithm, and generating the Kseaf based on the Kausf, the first identification information, and the second key derivation algorithm.

In the foregoing method, when generating the lower-layer key, the terminal may simultaneously generate the Kausf and the Kseaf in one negotiation process, so that negotiation efficiency can be improved.

In a possible design, the upper-layer key is a Kseaf, and the lower-layer key is at least one of a non-access stratum encryption key KNASenc, a non-access stratum integrity protection key KNASint, a base station key KgNB, and a non-3GPP access key Kn3iwf; and the generating, by the terminal, a lower-layer key based on an upper-layer key, the first identification information, and the second key derivation algorithm includes: generating, by the terminal, an access management key Kamf based on the Kseaf, the first identification information, and the second key derivation algorithm, and generating at least one of the KNASenc, the KNASint, the KgNB, and the Kn3iwf based on the Kamf and the second key derivation algorithm; or generating, by the terminal, a Kamf based on the Kseaf and the second key derivation algorithm, and generating at least one of the KNASenc, the KNASint, the KgNB, and the Kn3iwf based on the Kamf, the first identification information, and the second key derivation algorithm.

In the foregoing method, when generating the lower-layer key, the terminal may simultaneously generate at least one of the Kamf, the KNASenc, the KNASint, the KgNB, and the Kn3iwf in one negotiation process, so that negotiation efficiency can be improved.

In a possible design, the network side network element is a mobility management function entity AMF, the upper-layer key is a Kamf, and the lower-layer key is at least one of a KNASenc, a KNASint, a KgNB, and a Kn3iwf; or the network side network element is a security anchor entity SEAF, the upper-layer key is a Kseaf, and the lower-layer key is a Kamf; or the network side network element is an authentication service entity AUSF, the upper-layer key is a Kausf, and the lower-layer key is a Kseaf; or the network side network element is a unified data management entity, the upper-layer key is a CK and an IK, and the lower-layer key is at least one of a CK', an IK', and a Kausf; or the network side network element is a next generation NodeB gNB, the upper-layer key is a KgNB, and the lower-layer key is at least one of a radio connection control encryption key Krrc-enc, a radio connection control integrity protection key Krrc-int, a user plane encryption key Kup-enc, a user plane integrity protection key Kup-int, and a next hop NH; or the network side network element is a mobility management entity MME, the upper-layer key is an access management key Kamse, and the lower-layer key is at least one of a KNASenc and a KNASint; or the network side network element is a home subscriber server, the upper-layer key is a CK and an IK, and the lower-layer key is a Kasme; or the network side network element is an eNB, the upper-layer key is a KeNB, and the lower-layer key is at least one of a Krrc-enc, a Krrc-int, a Kup-enc, a Kup-int, and an NH.

According to a tenth aspect, this application provides a key derivation algorithm negotiation method, and the method may be performed by a network side network element or a chip in a network side network element. The method includes: receiving, by a network side network element, third identification information of a third key derivation algorithm, where the third key derivation algorithm is at least one key derivation algorithm that is received by the network side network element and that is supported by a terminal; selecting, by the network side network element, a fourth key derivation algorithm from the third key derivation algorithm based on a preset policy; generating, by the network side network element, a lower-layer key based on the third identification information, the fourth key derivation algorithm, and an upper-layer key; and sending, by the network side network element, fourth identification information of the fourth key derivation algorithm to the terminal.

In this application, the network side network element receives the third identification information of the third key derivation algorithm, where the third key derivation algorithm may be a key derivation algorithm that is tampered with in a sending process performed by the terminal. The network side network element selects one fourth key derivation algorithm from the third key derivation algorithm as a negotiated key derivation algorithm, and sends the fourth key derivation algorithm to the terminal, where the fourth key derivation algorithm may be tampered with to another key derivation algorithm in the sending process. Further, the network side network element generates the lower-layer key based on the upper-layer key, the third identification information, and the fourth key derivation algorithm. Because the third identification information of the third key derivation algorithm and the fourth key derivation algorithm are used when the lower-layer key is generated, if the third key derivation algorithm or the fourth key derivation algorithm is tampered with, the lower-layer key generated by the network side network element is different from a lower-layer key generated by the terminal, resulting in a communication failure. Only when the third key derivation algorithm and the third key derivation algorithm are not tampered with, a correct communication can be implemented, thereby improving the communication security.

In a possible design, the generating, by the network side network element, a lower-layer key based on the third identification information, the fourth key derivation algorithm, and an upper-layer key includes: generating, by the network side network element, the lower-layer key based on the upper-layer key, the third identification information, the fourth identification information, and the fourth key derivation algorithm.

In a possible design, the network side network element is a unified data management entity, the upper-layer key is a CK and an IK, and the lower-layer key is a Kausf; and the network side network element sends fourth identification information and the Kausf to an authentication service entity.

In a possible design, the network side network element is a security anchor entity, the upper-layer key is a Kseaf, and the lower-layer key is a Kamf; and the network side network element sends fourth identification information and the Kamf to a mobility management function entity AMF.

In a possible design, the network side network element is a mobility management function entity AMF, the upper-layer key is a Kamf, and the lower-layer key is at least one of a KNASenc, a KNASint, a KgNB, and a Kn3iwf; or the network side network element is a security anchor entity SEAF, the upper-layer key is a Kseaf, and the lower-layer key is a Kamf; or the network side network element is an authentication service entity AUSF, the upper-layer key is a Kausf, and the lower-layer key is a Kseaf; or the network side network element is a unified data management entity, the upper-layer key is a CK and an IK, and the lower-layer key is at least one of a CK', an IK', and a Kausf; or the network side network element is a next generation NodeB gNB, the upper-layer key is a KgNB, and the lower-layer key is at least one of a radio connection control encryption key Krrc-enc, a radio connection control integrity protection key Krrc-int, a user plane encryption key Kup-enc, a user plane integrity protection key Kup-int, and a next hop NH; or the network side network element is a mobility management entity MME, the upper-layer key is an access management key Kamse, and the lower-layer key is at least one of a KNASenc and a KNASint; or the network side network element is a home subscriber server, the upper-layer key is a CK and an IK, and the lower-layer key is a Kasme; or the network side network element is an eNB, the upper-layer key is a KeNB, and the lower-layer key is at least one of a Krrc-enc, a Krrc-int, a Kup-enc, a Kup-int, and an NH.

According to an eleventh aspect, this application further provides a computer-readable storage medium. The computer-readable storage medium stores an instruction, and when the instruction is run on a computer, the computer is enabled to perform the method according to the foregoing aspects.

According to a twelfth aspect, this application further provides a computer program product including an instruction. When the computer program product is run on a computer, the computer is enabled to perform the method according to the foregoing aspects.

These aspects or other aspects of this application are clearer and more comprehensible in descriptions of the following embodiments.

DESCRIPTION OF EMBODIMENTS

To make the objectives, technical solutions, and advantages of this application clearer, the following further describes this application in detail with reference to the accompanying drawings. A specific operation method in method embodiments may also be applied to an apparatus embodiment or a system embodiment. In the descriptions of this application, unless otherwise stated, "a plurality of" indicates at least two.

It should be noted that, a key derivation algorithm negotiation method in this application may be performed by an apparatus. On a network side, the apparatus may be a storage function entity or a chip in a storage function entity, or may be a mobility management function entity or a chip in a mobility management function entity. The storage function entity may be configured to store a permanent key of a terminal, and for example, the storage function entity may be an HSS, a UDM entity, or an ARPF entity. The mobility management function entity may be configured to manage mobility of a terminal, and for example, the mobility management function entity may be an MME, or an AMF entity. On a terminal side, the apparatus may be a terminal or a chip in a terminal.

For the purpose of convenient description, in this application, a key derivation algorithm negotiation method of this application is described by using an example in which the apparatus is a storage function entity, a mobility management function entity, or a terminal. For an implementation method in which the apparatus is a chip in the storage function entity, a chip in the mobility management function entity, or a chip in the terminal, refer to a specific description of the key derivation algorithm negotiation method of the storage function entity, the mobility management function entity, and the terminal. Details are not described again.

Figure 1:
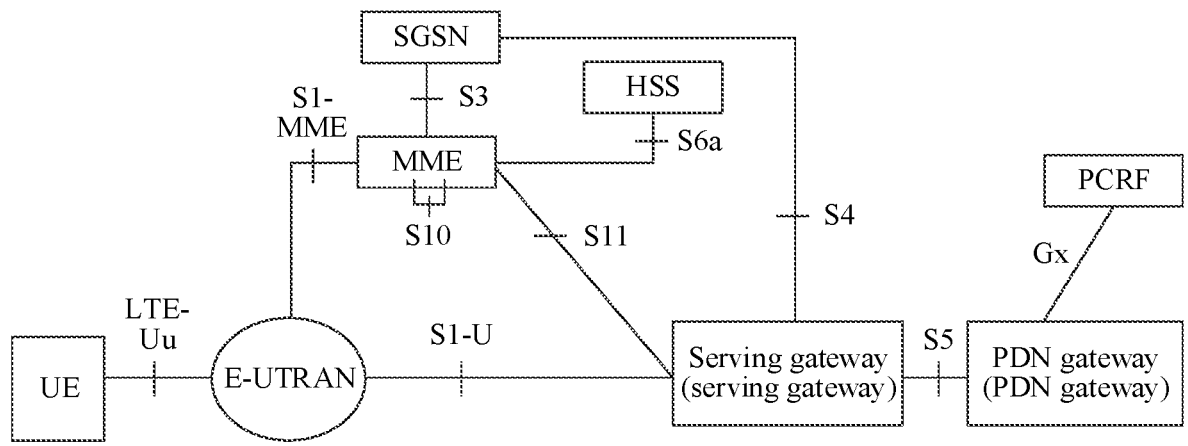
FIG. 1 is a schematic diagram of a possible network architecture according to an embodiment.

FIG. 1 is a schematic diagram of a possible network architecture applicable to this application. The network architecture is a 4G network architecture. A network element in the 4G architecture includes a terminal, and in the figure, for example, the terminal is user equipment (UE). The network architecture further includes a Mobility Management Entity (MME), a Serving GPRS Support Node (SGSN), a Home Subscriber Server (HSS), a serving gateway (S-GW), a Packet Data Network gateway (P-GW), a Policy and Charging Rules Function (PCRF) entity, an Evolved Universal Terrestrial Radio Access Network (E-TURAN), and the like.

The E-UTRAN includes a plurality of Evolved NodeB (eNodeB), the eNodeBs are interconnected to each other by using an X2 interface, the eNodeB is interconnected to an Evolved Packet Core (EPC) by using an S1 interface, and the eNodeB is interconnected to the UE by using an LTE-Uu.

The MME is mainly responsible for supporting non-access stratum (NAS) signaling and NAS signaling security, management of a tracking area (Track Area, TA) list, selection of the P-GW and the S-GW, MME selection during inter-MME handovers, SGSN selection during a handover process to a 2G/3G access system, user authentication, roaming restrictions and bearer management, and mobility management between core network nodes between different 3rd Generation Partnership Project (3GPP) access networks.

The S-GW is a gateway that terminates the E-UTRAN interface, and the main functions of the S-GW includes: acting as a local anchor point during inter-eNodeB handovers to help complete a resequencing function of the eNodeBs; acting as a mobility anchor during different 3GPP access inter-system handovers; lawful interception; routing and forwarding of packets; performing packet marking on an uplink transport layer and a downlink transport layer; charging operators; and the like.

The P-GW is a gateway to a PDN and terminates a SGi interface. If the UE accesses a plurality of PDNs, the UE corresponds to one or more P-GWs. Main functions of the P-GW include user-based packet filtering, lawful interception, Internet Protocol (IP) address allocation for the UE, transport-level packet marking in the uplink, uplink and downlink service level charging and service gating control, control of service-based uplink and downlink rates, and the like.

The HSS is a database configured to store user subscription information, and a home network may include one or more HSSs. The HSS is responsible for storing information about subscribers, for example, subscriber identifiers, numbers and routing information, security information, location information, and profile information.

The SGSN may be configured to perform signaling interworking for mobility between the 2G/3G access network and the E-UTRAN 3GPP access network, including the selection of the P-GW and the S-GW, and the MME selection for subscribers during handover to the E-UTRAN 3GPP access network.

The PCRF entity terminates an Rx interface and a Gx interface. In a non-roaming scenario, there is only one PCRF in a Home Public Land Mobile Network (HPLMN) associated with one IP-Connectivity Access Network (IP-CAN) session of the UE; and in a roaming scenario with local breakout of traffic, there may be two PCRFs associated with one UE's IP-CAN session.

In the architecture shown in FIG. 1, main network elements related to this application are: the UE, the MME, and the HSS.

Figure 2:
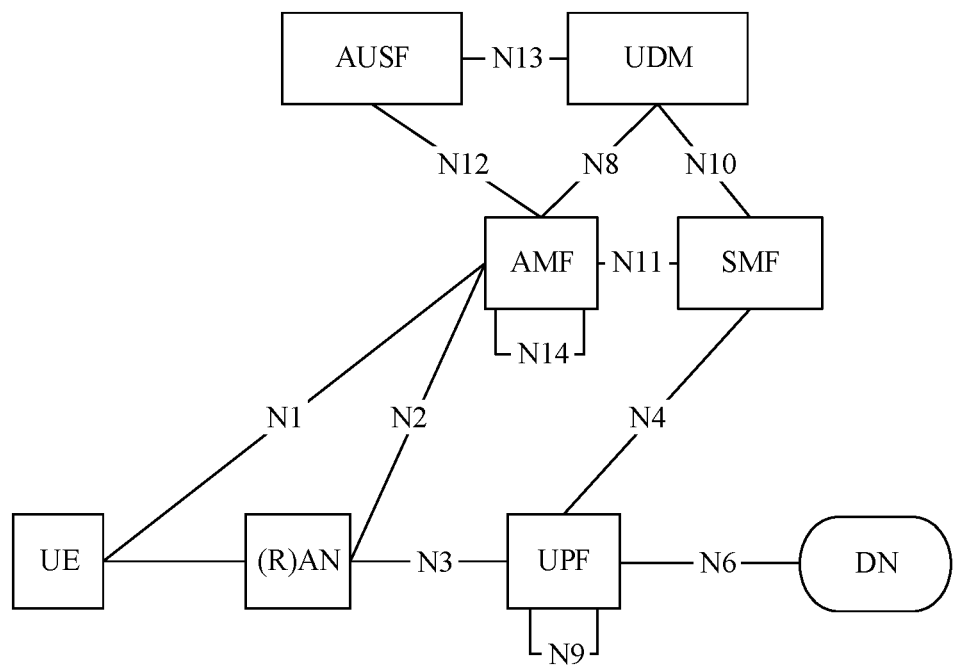
FIG. 2 is a schematic diagram of another possible network architecture according to an embodiment.

FIG. 2 is a schematic diagram of another possible network architecture applicable to this application. The network architecture is a 5G network architecture. A network element in the 5G architecture includes a terminal, and in the figure, for example, the terminal is UE. The network architecture further includes a Radio Access Network (RAN), an Access and Mobility Management Function (AMF) entity, a session management function (SMF) entity, a user plane function (UPF) entity, Unified Data Management (UDM) entity, an Authentication Server Function (AUSF) entity, an Authentication Credential Repository and Processing Function (ARPF) entity (not shown in the figure), a Security Anchor Function (SEAF) entity (not shown in the figure), a Data Network (DN), and the like.

A main function of the RAN is to control subscribers to access a mobile communication network in a wireless manner. The RAN is part of a mobile communications system. The RAN implements a radio access technology. Conceptually, the RAN resides between a device (such as a mobile phone, a computer, or any remotely controlled machine) and provides connection with a core network of the RAN. A RAN device includes, but is not limited to, a next generation NodeB in 5G (gNodeB, gNB), an evolved NodeB (eNB), a radio network controller (RNC), a NodeB (NB), a base station controller (BSC), a base transceiver station (BTS), a home base station (for example, a home evolved NodeB, or a home NodeB, HNB), a BaseBand Unit (BBU), a transmitting and receiving point (TRP), a transmitting point (TP), a mobile switching center, and the like. In addition, the RAN device may further include a wireless fidelity (Wi-Fi) access point (AP), and the like.

The AMF entity is responsible for access management and mobility management for the terminal. In an actual application, the AMF entity includes a mobility management function of a mobility management entity (MME) in an LTE network framework, and an access management function is added to the AMF entity.

The SMF entity is responsible for session management, for example, subscriber session establishment.

The UPF entity is a functional network element of a user plane, and is mainly responsible for connecting to an external network. The UPF entity includes functions related to a serving gateway (SGW) and a public data network gateway (, PDN-GW) of the LTE.

The DN is a network that is responsible for providing a service to the terminal. For example, some DNs provide an Internet access function to the terminal, and some other DNs provide a short message service message function to the terminal. The SEAF entity is configured to complete an authentication process of the UE, and in 5G, functions of the SEAF may be combined to the AMF entity.

The AUSF entity has an authentication service function, and is configured to terminate an authentication function requested by the SEAF.

The AMF entity is responsible for access management and mobility management for the terminal. In an actual application, the AMF entity includes a mobility management function of an MME in a Long Term Evolution ( ), and an access management function is added to the AMF entity.

The ARPF entity has an authentication credential repository and processing function, configured to store permanent authentication credentials of subscribers, such as a permanent key K. In 5G, functions of the ARPF may be combined to the UDM entity.

The UDM entity may store subscription information of the subscribers, to implement a backend similar to that of the HSS in 4G.

In the architecture shown in FIG. 2, main network elements related to this application are: the UE, the AMF entity, the HSS entity, the SEAF entity, the AUSF entity, and the ARPF entity.

The terminal in this application is a device having a wireless receiving and sending function. The device may be deployed on land, including an indoor or outdoor device, a handheld device, or an in-vehicle device; or may be deployed on water (for example, on a steamer); or may be deployed in air (for example, on an air plane, a balloon, or a satellite). The terminal may be a mobile phone, a tablet computer, a computer having a wireless receiving and sending function, a virtual reality (VR) terminal, an augmented reality (AR) terminal, a wireless terminal related to industrial control (industrial control), a wireless terminal related to self driving, a wireless terminal related to remote medical, a wireless terminal related to a smart grid, a wireless terminal related to transportation safety, a wireless terminal related to a smart city, a wireless terminal related to a smart home, or the like. For example, the UE in FIG. 1 and the UE in FIG. 2 are specific examples of the terminal.

This application is not only applicable to the 4G network architecture shown in FIG. 1, but also applicable to the 5G network architecture shown in FIG. 2.

For the purpose of convenient description, in this application, the MME entity in 4G and the AMF entity in 5G are collectively referred to as a mobility management function entity. The HSS entity in 4G, and the APRF entity and the UDM entity in 5G are collectively referred to as a storage function entity. In addition, the mobility management function entity and the storage function entity are collectively referred to as a network side node.

The following describes a key derivation algorithm negotiation method of this application with reference to the accompanying drawings.

Figure 3:
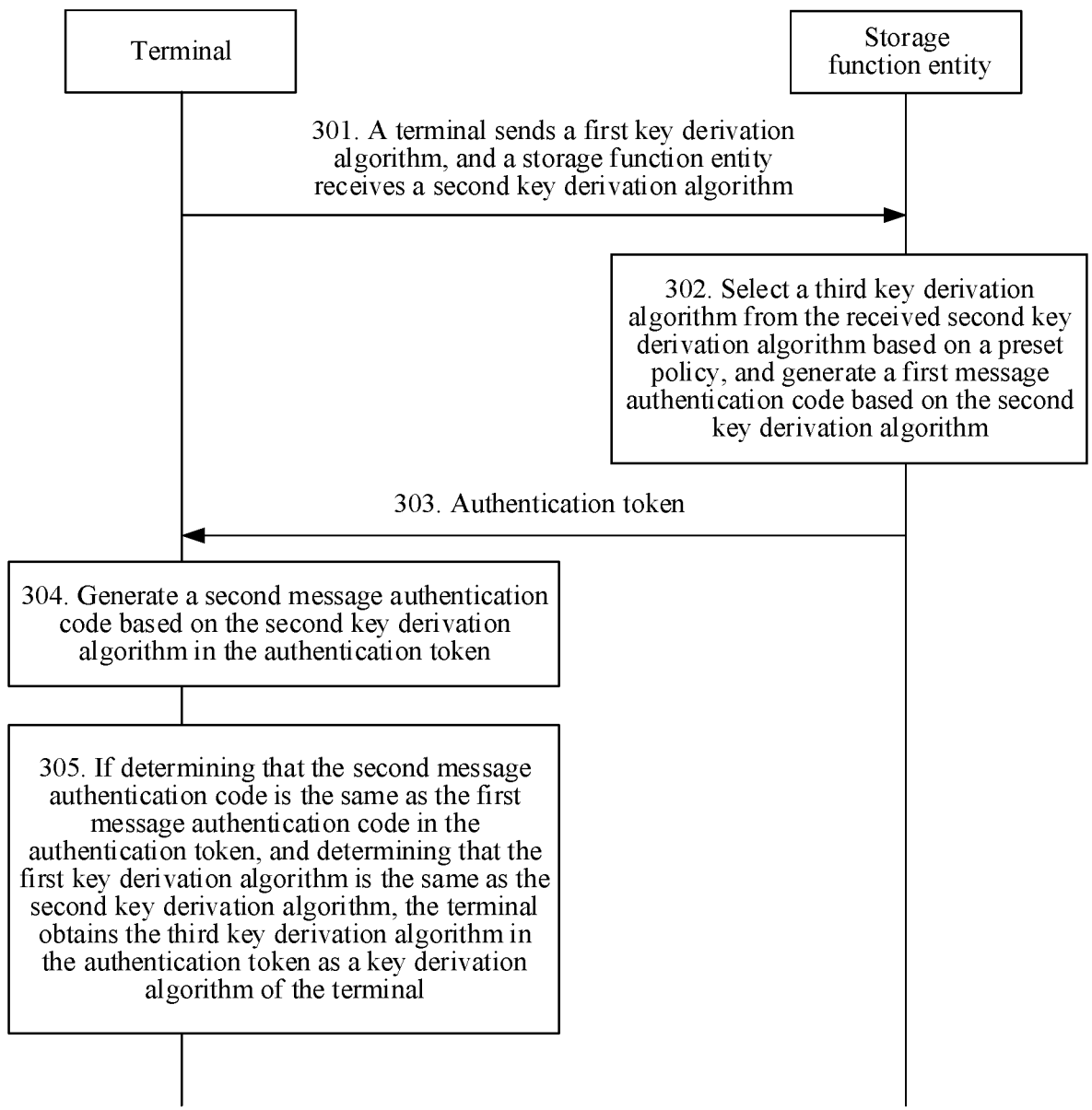
FIG. 3 is a schematic diagram of a key derivation algorithm according to an embodiment.

FIG. 3 is a schematic diagram of a key derivation algorithm according to this application, including the following steps.

Step 301. A terminal sends a first key derivation algorithm to a storage function entity, and the storage function entity receives a second key derivation algorithm.

The first key derivation algorithm may be used to indicate capabilities of the key derivation algorithm of the terminal, that is, the first key derivation algorithm is a key derivation algorithm supported by the terminal. For example, the key derivation algorithms supported by the terminal are KDF1, KDF2, and KDF3, so that the first key derivation algorithm is {KDF1, KDF2, KDF3}.

During specific implementation, the first key derivation algorithm sent by the terminal may be an identifier of the key derivation algorithm supported by the terminal. For example, when the key derivation algorithms supported by the terminal are the KDF1, the KDF2, and the KDF3, the first key derivation algorithm sent by the terminal is {identifier of KDF1, identifier of KDF2, identifier of KDF3}.

In this application, the key derivation algorithm that is received by the storage function entity and the mobility management function entity and that is sent by the terminal is referred to as the second key derivation algorithm.

During specific implementation, the second key derivation algorithm may be the identifier of the key derivation algorithm supported by the terminal.

A specific method in which the terminal sends the first key derivation algorithm to the storage function entity may be, for example, as follows.

In 4G, the terminal first sends an attach request message or a tracking area update (TAU) request message to the MME, and the request message includes a KDF supported by the UE. The MME sends an authentication data request message to the HSS, and the message includes the second key derivation algorithm.

In 5G, the terminal first sends a registration request (Registration Request) message to the AMF entity or the SEAF entity, and the registration request message includes the first key derivation algorithm. The AMF entity or the SEAF entity sends an authentication initiation request message to the AUSF entity, and the authentication initiation request message includes the first key derivation algorithm. The AUSF entity sends an authentication information request message to the ARPF entity or the UDM entity, and the authentication information request message includes the second key derivation algorithm.

An initial message including the first key derivation algorithm and sent by the terminal, for example, the attach request message or the tracking area update request message in 4G, or the registration request message in 5G, is vulnerable to an attacker due to lack of the integrity protection, and the attacker may tamper with the first key derivation algorithm in the initial message. In other words, the second key derivation algorithm is a key derivation algorithm that is tampered with, and in this case, the second key derivation algorithm may be different from the first key derivation algorithm.

Alternatively, the first key derivation algorithm sent by the terminal is not attacked by an attacker, so that the second key derivation algorithm received by the storage function entity is the same as the first key derivation algorithm sent by the terminal.

Therefore, the second key derivation algorithm received by the storage function entity may be the same as, or may be different from, the first key derivation algorithm sent by the terminal.

Step 302. The storage function entity selects a third key derivation algorithm from the received second key derivation algorithm based on a preset policy.

The second key derivation algorithm is at least one key derivation algorithm that is received by the storage function entity and that is supported by the terminal.

After receiving the second key derivation algorithm, the storage function entity selects, based on the preset policy, one third key derivation algorithm from the second key derivation algorithm as a negotiated key derivation algorithm used for the terminal and the storage function entity to communicate.

During specific implementation, the third key derivation algorithm may be indicated by an identifier of the third key derivation algorithm.

The preset policy may be a priority policy, that is, a key derivation algorithm having a highest priority is selected; may be a quantity policy, that is, a key derivation algorithm used in a maximum quantity of times is selected; or may be another policy. This is not limited in this application.

For the purpose of convenient description, the following is described by using the priority policy as an example.

For example, the first key derivation algorithm is {KDF1, KDF2, KDF3}, and a priority of the KDF1<a priority of the KDF2<a priority of the KDF3. If the first key derivation algorithm is not attacked and not tampered with, the second key derivation algorithm received by the storage function entity is the same as the first key derivation algorithm, and is also the {KDF1, KDF2, KDF3}, so that the third key derivation algorithm selected by the storage function entity from the second key derivation algorithm is the KDF3.

For another example, the first key derivation algorithm is {KDF1, KDF2, KDF3}, and a priority of the KDF1<a priority of the KDF2<a priority of the KDF3. If the first key derivation algorithm is attacked and tampered with, (where the first key derivation algorithm is usually modified to a key derivation algorithm having only a lowest priority, to facilitate key cracking), for example, the second key derivation algorithm received by the storage function entity is {KDF1}, so that the third key derivation algorithm selected by the storage function entity from the second key derivation algorithm is the KDF1.

Step 303. The storage function entity sends an authentication token to the terminal, and the terminal receives the Authentication Token (AUTN) from the storage function entity.

After selecting the third key derivation algorithm, the storage function entity needs to send the third key derivation algorithm to the terminal. In this application, in a process of sending the third key derivation algorithm, the storage function entity further sends the second key derivation algorithm received by the storage function entity to the terminal, so that the terminal checks whether the first key derivation algorithm sent by the terminal is tampered with.

In this application, the authentication token includes a first Message Authentication Code (MAC), the second key derivation algorithm, and the selected third key derivation algorithm. In addition, the first message authentication code is generated based on the second key derivation algorithm.

Several implementation methods of the AUTN are provided below with reference to the accompanying drawings.

Implementation method 1: The AUTN includes an Authentication Management Field (AMF) and the MAC, the AMF includes the second key derivation algorithm and the third key derivation algorithm, and the MAC is the first message authentication code.

In one implementation, for example, the application management field AMF includes 8 bits, and the terminal supports a maximum of 4 algorithms, for example, KDF1, KDF2, KDF3, and KDF4. Two bits in the AMF are used to indicate the selected third key derivation algorithm, and four bits in the AMF are used to indicate the received second key derivation algorithm.

Figure 4:
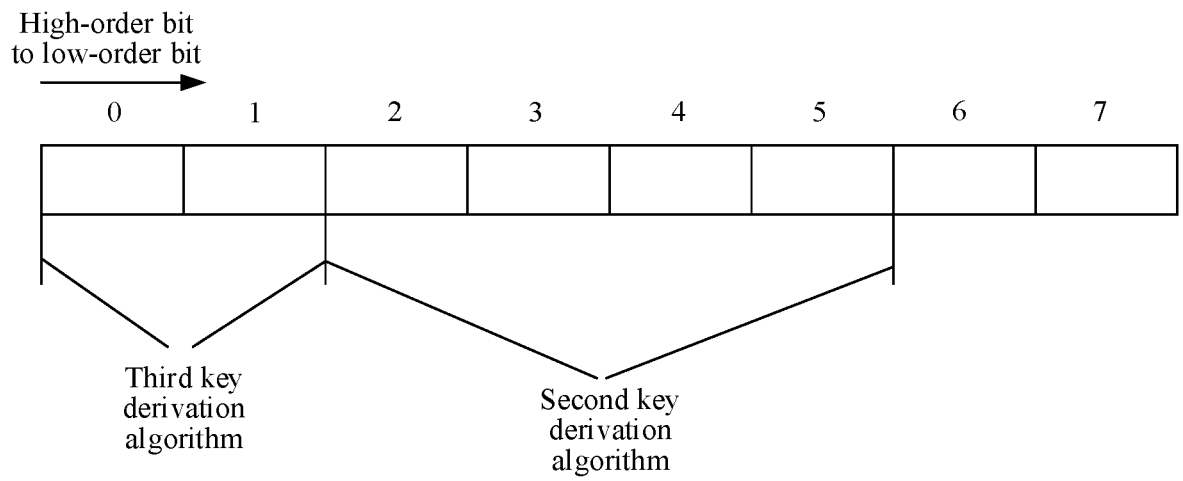
FIG. 4 is a schematic diagram of an application management field AMF according to an embodiment.

For example, FIG. 4 is an exemplary diagram of the AMF. The least significant bit and the first bit are used to indicate the selected third key derivation algorithm, for example, "00" indicates that the third key derivation algorithm is the KDF1, "01" indicates that the third key derivation algorithm is the KDF2, "10" indicates that the third key derivation algorithm is the KDF3, and "11" indicates that the third key derivation algorithm is the KDF4. The second bit to the fifth bit are respectively used to indicate whether the KDF1, the KDF2, the KDF3, and the KDF4 are received, where "1" indicates that the KDF is received, and "0" indicates that the KDF is not received. For example, when the second bit to the fifth bit is "0000", it indicates that the received second key derivation algorithm is empty; when the second bit to the fifth bit is "0100", it indicates that the received second key derivation algorithm is the KDF2; and when the second bit to the fifth bit is "1110", it indicates that the received second key derivation algorithms are the KDF1, the KDF2, and the KDF3.

Certainly, FIG. 4 is only illustrated by using as an example. For example, other bits may also be used to indicate the second key derivation algorithm and the third key derivation algorithm. This is not limited in this application. Alternatively, when the AMF does not have 8 bits, the implementation method is also similar.

Figure 5:
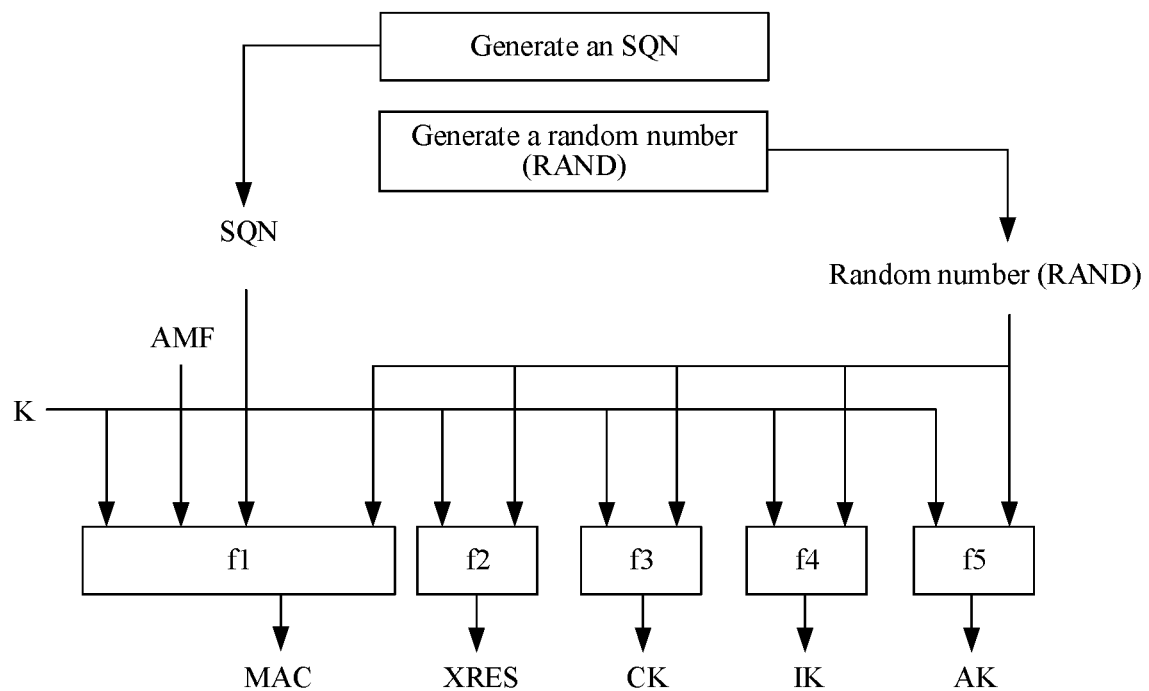
FIG. 5 is a schematic diagram of parameter generation according to an embodiment.

A specific implementation of generating the AUTN is provided below with reference to the accompanying drawings. FIG. 5 is a schematic diagram of parameter generation.

Referring to FIG. 5, the storage function entity generates a sequence number (SQN) and a random number (RAND), and separately generates a MAC (that is, the first message authentication code), an expected response (XRES), a cipher key (CK), an integrity key (IK), and an anonymity key (AK), where MAC=f1(K, AMF, SQN, RAND), a form of the application management field AMF is shown in FIG. 4, the AMF includes the second key derivation algorithm and the third key derivation algorithm;

XRES=f2 (K, RAND);
CK=f3 (K, RAND);
IK=f4 (K, RAND); and
AK=f5 (K, RAND), where f1, f2, f3, f4, and f5 indicate functions, and the terminal also stores the same functions.

Then, the AUTN and an authentication vector (Authentication Vector, AV) are generated based on the foregoing parameters, and specifically:

AUTN:=SQN⊕AK∥AMF∥MAC; and
AV:=RAND∥XRES∥CK∥IK∥AUTN.

The AUTN includes SQN⊕AK, the AMF, and the MAC, where ⊕ is an and/or symbol, indicating an and/or operation result between the SQN and the AK, and "∥" is a bound symbol. For example, 00∥11 indicates 0011. Therefore, the AUTN includes the MAC (the first message authentication code), the second key derivation algorithm, and the third key derivation algorithm, where the second key derivation algorithm and the third key derivation algorithm are carried in the authentication management field AMF.

Optionally, in an implementation, the AUTN may also be carried in the AV and sent to the terminal, where the AV includes the RAND, the XRES, the CK, the IK, and the AUTN.

In this way, the second key derivation algorithm, the third key derivation algorithm, the first message authentication code, and another possible parameter that may be needed are sent to the terminal.

Implementation method 2: The AUTN includes an authentication management field AMF, the second key derivation algorithm, and the MAC, the AMF includes the third key derivation algorithm, and the MAC is the first message authentication code.

Specifically, in an implementation, for example,

AUTN:=second key derivation algorithm∥SQN⊕AK∥AMF∥MAC,
MAC=f1(K, AMF, SQN, RAND, second key derivation algorithm).

For the ATUN, a main difference between the implementation method 2 and the implementation method 1 lies in that: first, the second key derivation algorithm is carried in the AMF in the implementation method 1, and the second key derivation algorithm is carried in the AUTN in the implementation method 2. Because a quantity of bits in the AMF is limited, the second key derivation algorithm is moved outside the AMF, so that the method in this application is still applicable when the terminal supports a relatively wide variety of key derivation algorithms. For example, it is assumed that the AMF has 8 bits, based on the implementation method 1, if the terminal supports more than 5 key derivation algorithms, the implementation method 1 cannot be performed. However, based on the implementation method 2, the terminal supports a maximum of $2^8$ key derivation algorithms.

For the MAC, the second key derivation algorithm further needs to be used as an input parameter when the MAC is generated.

Based on the implementation method 1 or the implementation method 2, after the AUTN is generated, the AUTN is sent to the terminal, and the AUTN is sent under the protection of an integrity protection algorithm and is not tampered with by an attacker.

Optionally, the AUTN is carried in the AV and sent to the terminal.

In an implementation, in 4G, a method for sending the AUTN by the storage function entity to the terminal is as follows:

The HSS entity sends an authentication data response (Authentication Data Response) message to the MME, where the message includes the AUTN; and the MME sends a user authentication request (User Authentication Request) message to the terminal, where the message includes the AUTN.

In an implementation, in 5G, a method for sending the AUTN by the storage function entity to the terminal is:

sending, by the UDM entity or the ARPF entity, an authentication information answer message to the AUSF entity, where the message includes the AUTN;

sending, by the AUSF entity, an authentication initiation response message to the SEAF entity or the AMF entity, where the message includes the AUTN; and sending, by the SEAF entity or the AMF entity, an authentication request message to the terminal, where the message includes the AUTN.

Step 304. The terminal generates a second message authentication code based on the second key derivation algorithm in the authentication token.

After receiving the authentication token, the terminal obtains, from the authentication token, the first message authentication code, the second key derivation algorithm, and the third key derivation algorithm.

Then, the terminal generates the second message authentication code based on the second key derivation algorithm. The generation method is the same as the method for generating the first message authentication code by the storage function entity. For example, corresponding to two specific implementation methods of sending the AUTN by the storage function entity, there are two methods of generating the second message authentication code as follows.

Method 1, corresponding to the implementation method 1

When the first message authentication code (MAC)=f1(K, AMF, SQN, RAND), where the AMF includes the second key derivation algorithm and the third key derivation algorithm, AUTN:=SQN⊕AK∥AMF∥MAC, and AV:=RAND∥XRES∥CK∥IK∥AUTN, the method for generating the second message authentication code by the terminal is:

the second message authentication code (MAC1)=f1(K, AMF, SQN, RAND), where K is stored in the terminal, the AMF is obtained from the AUTN, the RAND is obtained from the AV, the AK may be derived based on K, and the SQN may be obtained based on the AK and SQN⊕AK.

Method 2, corresponding to the implementation method 2

When the first message authentication code (MAC)=f1(K, AMF, SQN, RAND, second key derivation algorithm), where the AMF includes the third key derivation algorithm, AUTN:=second key derivation algorithm||SQN⊕AK||AMF-||MAC, and AV:=RAND||XRES||CK||IK||AUTN, the method for generating the second message authentication code by the terminal is:

the second message authentication code (MAC1)=f1(K, AMF, SQN, RAND, second key derivation algorithm), where K is stored in the terminal, the AMF is obtained from the AUTN, the RAND is obtained from the AV, the AK may be derived based on K, the SQN may be obtained based on the AK and SQN⊕AK, and the second key derivation algorithm is obtained from the AUTN.

Step 305. If determining that the second message authentication code is the same as the first message authentication code in the authentication token, and determining that the first key derivation algorithm is the same as the second key derivation algorithm, the terminal obtains the third key derivation algorithm in the authentication token as the key derivation algorithm of the terminal.

The terminal compares the first key derivation algorithm with the second key derivation algorithm, and if determining that the first key derivation algorithm is the same as the second key derivation algorithm, the terminal checks the received first message authentication code by using the generated second message authentication code. The way of checking the message authentication code is described below with reference to specific examples.

It is assumed that the first key derivation algorithm is {KDF1, KDF2, KDF3}, and a priority of the KDF1<a priority of the KDF2<a priority of the KDF3. In addition, the implementation method 2 of sending the AUTN and the method 2 of generating the second message authentication code are used as examples.

Example 1

The second key derivation algorithm is {KDF1} the first message authentication code (MAC)=f1(K, AMF, SQN, RAND, KDF1);

AUTN:=KDF1||SQN⊕AK||AMF||MAC; and the second message authentication code generated by the terminal (MAC1)=f1(K, AMF, SQN, RAND, KDF1).

The terminal checks whether the MAC is the same as the MAC1. If the two are same, the checking on the MAC is correct, and the correct checking indicates that parameters that generate the first message authentication code are the same as parameters that generate the second message authentication code, that is, the parameters are not tampered with. If the checking is incorrect, possibly due to that the parameters are tampered with, follow-up procedures may be performed based on the method in the prior art. For example, the method may be that: the terminal sends an error indication message to the storage function entity, and the error indication message may be an authentication failure message.

It is assumed that the checking result is MAC1=MAC, so that the checking is correct. Then the terminal compares whether the second key derivation algorithm obtained from the AUTN is the same as the first key derivation algorithm of the terminal. Because the second key derivation algorithm is {KDF1}, the first key derivation algorithm is {KDF1, KDF2, KDF3}, and due to the difference, the terminal determines that the sent first key derivation algorithm is tampered with, and does not use the third key derivation algorithm, but to use the default key derivation algorithm, to generate a key of the terminal, such as an access security management entity key, Kasme). In addition, a negotiation process also needs to be initiated again, and the key of the terminal and the key of the storage function entity are updated in the new process. The following describes the way of updating in detail.

Example 2

The second key derivation algorithm is {KDF1, KDF2, KDF3} the first message authentication code (MAC)=f1(K, AMF, SQN, RAND, {KDF1, KDF2, KDF3});

AUTN:={KDF1, KDF2, KDF3}||SQN⊕AK||AMF||MAC; and the second message authentication code generated by the terminal (MAC1)=f1(K, AMF, SQN, RAND, {KDF1, KDF2, KDF3}).

It is assumed that MAC1=MAC, and because the first key derivation algorithm is {KDF1, KDF2, KDF3}, the second key derivation algorithm is {KDF1, KDF2, KDF3}, the checking on the MAC is correct, and the first key derivation algorithm is the same as the second key derivation algorithm, so that the terminal obtains the third key derivation algorithm as the key derivation algorithm of the terminal, and generates, based on the third key derivation algorithm, the key of the terminal, such as a Kasme. Until now, the process ends.

According to the key derivation algorithm negotiation method, the terminal checks the sent first key derivation algorithm and the received second key derivation algorithm; if the checking is correct and the first key derivation algorithm is the same as the second key derivation algorithm, the terminal determines that the first key derivation algorithm sent by the terminal is not tampered with by an attacker; and then uses the negotiated third key derivation algorithm as a key derivation algorithm of the terminal, to ensure confidentiality of the negotiated key derivation algorithm, thereby improving communication security.

Figure 6:
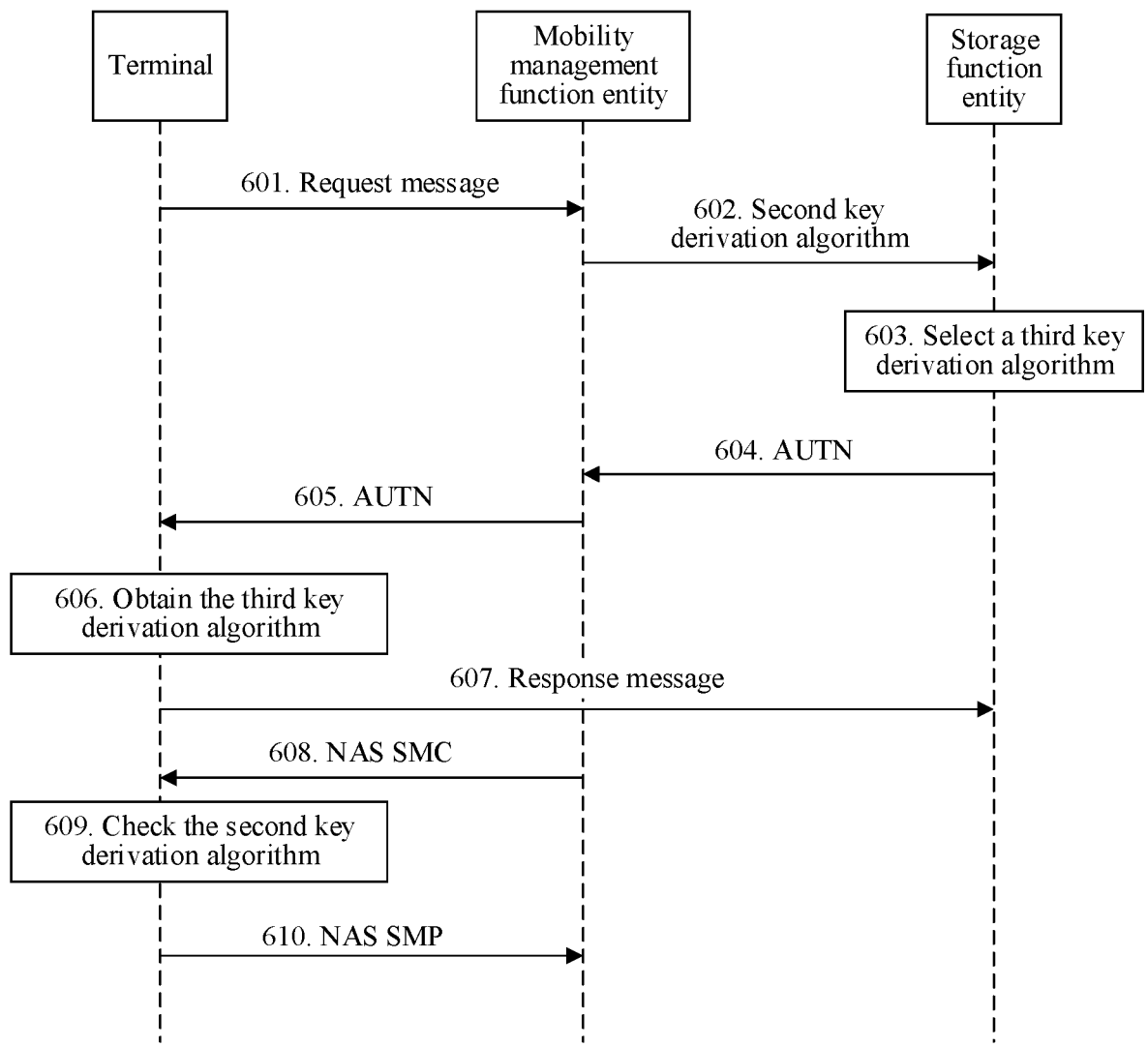
FIG. 6 shows another key derivation algorithm negotiation method according to an embodiment.

As shown in FIG. 6, this application further provides another key derivation algorithm negotiation method, and the method is used for the terminal and the storage function entity to negotiate the key derivation algorithm. The method includes the following the steps.

Step 601. The terminal sends a request message to a mobility management function entity, and the mobility management function entity receives the request message from the terminal.

The request message may be an attach request message or a tracking area update request message in 4G, or a registration request message in 5G.

The request message includes a first key derivation algorithm, and the first key derivation algorithm is at least one key derivation algorithm supported by the terminal.

The terminal sends the first key derivation algorithm, and the mobility management function entity receives a second key derivation algorithm, where the second key derivation algorithm is at least one key derivation algorithm that is received by the mobility management function entity and that is supported by the terminal.

The second key derivation algorithm may be the same as, or may be different from, the first key derivation algorithm.

For example, when being tampered with by an attacker, the second key derivation algorithm is different from the first key derivation algorithm.

Step 602. The mobility management function entity sends the second key derivation algorithm to the storage function entity, and the storage function entity receives the second key derivation algorithm from the mobility management function entity.

For example, in 4G, the second key derivation algorithm may be carried in an authentication data request message, and in 5G, the second key derivation algorithm may be carried in an authentication information request message.

Step 603. The storage function entity selects a third key derivation algorithm from the second key derivation algorithm.

The storage function entity selects, based on the second key derivation algorithm and an algorithm priority list preconfigured by the storage function entity, one key derivation algorithm having a highest priority, that is, the third key derivation algorithm, as the key derivation algorithm negotiated between the terminal and the storage function entity.

Optionally, the storage function entity may add the third key derivation algorithm to some bits bit of an authentication management field AMF. For a specific description, refer to the foregoing description.

Step 604. The storage function entity sends an AUTN to the mobility management function entity, and the mobility management function entity receives the AUTN from the storage function entity.

The AUTN includes the AMF and a MAC, and some bits bit in the AMF are set to indicate the third key derivation algorithm. The MAC is generated by the storage function entity based on the AMF, a K, a RAND, and an SQN. Because the AMF does not include the second key derivation algorithm, in this embodiment, the MAC is not generated based on the second key derivation algorithm. In other words, the MAC does not include the second key derivation algorithm.

Step 605. The mobility management function entity sends the AUTN to the terminal, and the terminal receives the AUTN from the mobility management function entity.

In step 604 and step 605, the specific implementation of sending the AUTN by the storage function entity to the mobility management function entity, and the specific implementation of sending the AUTN by the mobility management function entity to the terminal may be, for example, as follows.

In one implementation, in 4G, the HSS entity sends an authentication data response message to the MME, where the message includes the AUTN; and the MME sends a user authentication request message to the terminal, where the message includes the AUTN.

In one implementation, in 5G, the UDM entity or the ARPF entity sends an authentication information answer message to the AUSF entity, where the message includes the AUTN; the AUSF entity sends an authentication initiation response message to the SEAF entity or the AMF entity, where the message includes the AUTN; and the SEAF entity or the AMF entity sends an authentication request message to the terminal, where the message includes the AUTN.

Step 606. The terminal obtains the third key derivation algorithm.

Specifically, the terminal obtains the MAC and the AMF from the received AUTN.

First, the MAC is checked. Specifically, the terminal generates a MAC1 based on the K, the AMF, the RAND, and the SQN, and compares the MAC1 with the MAC obtained from the AUTN. If the two are the same, the checking is correct.

If the checking is correct, the terminal obtains the third key derivation algorithm in the AMF as the key derivation algorithm negotiated between the terminal and the storage function entity.

Step 607. The terminal sends a response message to the storage function entity, and the storage function entity receives the response message from the terminal. For example, the response message may be an authentication response message, to notify the storage function entity of a negotiation failure or a successful negotiation.

The negotiation process of the key derivation algorithm between the terminal and the storage function entity is completed by performing step 601 to step 607. However, whether the first key derivation algorithm sent by the terminal is tampered with is not determined in the foregoing process. The following gives descriptions by using an example.

For example, the first key derivation algorithm is {KDF1, KDF2, KDF3}, and a priority of the KDF1<a priority of the KDF2<a priority of the KDF3. If the first key derivation algorithm included in step 601 is tampered with by an attacker to be the KDF1, that is, the second key derivation algorithm is {KDF1}, the third key derivation algorithm selected in step 603 is the KDF1, and the third key derivation algorithm obtained by the terminal in step 606 is the KDF1. Therefore, the negotiation on the key derivation algorithm is only completed by a process of performing step 601 to step 607. However, whether the first key derivation algorithm is tampered with by the attacker still cannot be determined.

Therefore, after step 607, the following steps are further included, to determine whether the first key derivation algorithm is attacked.

Step 608. The mobility management function entity sends a NAS SMC message to the terminal, and the terminal receives the NAS SMC message from the mobility management function entity.

The NAS SMC message includes the second key derivation algorithm, and because the NAS SMC message is protected by an integrity protection algorithm, content of the NAS SMC message is not tampered with.

Step 609. The terminal obtains the second key derivation algorithm, and checks the second key derivation algorithm.

Specifically, the terminal compares the first key derivation algorithm with the second key derivation algorithm. If the two are the same, the checking is correct, and if the two are different, the checking is incorrect.

Step 610. The terminal sends a NAS SMP message to the mobility management function entity, and the mobility management function entity receives the NAS SMP message from the terminal.

In step 609, if the checking on the second key derivation algorithm is correct, the NAS SMP message is used to notify that the checking is completed. The process ends.

In step 609, if the checking on the second key derivation algorithm is incorrect, the NAS SMP message may include the request message in step 601 again, where the request message includes the first key derivation algorithm, and initiate the negotiation process again. The specific process of renegotiation is described below in detail.

It should be noted that because the NAS SMP message is integrity protected, the NAS SMP message is not tampered with by an attacker. In other words, the first key derivation algorithm is sent in step 610, and the mobility management function entity and the storage function entity also receive the first key derivation algorithm.

Alternatively, it may also be understood that, the second key derivation algorithm received by the mobility management function entity and the storage function entity is the same as the first key derivation algorithm.

In the foregoing embodiment, when the key derivation algorithm is negotiated between the terminal and the storage function entity, step 601 to step 607 are first performed, to complete the negotiation of the key derivation algorithm, and step 608 and step 609 are then performed to check the second key derivation algorithm. If the checking is correct, it is determined that the first key derivation algorithm is not attacked, so that the negotiated third key derivation algorithm may be used as a key derivation algorithm of the terminal; and if the checking fails, step 610 is performed to initiate the negotiation process of the key derivation algorithm again.

Figure 7:
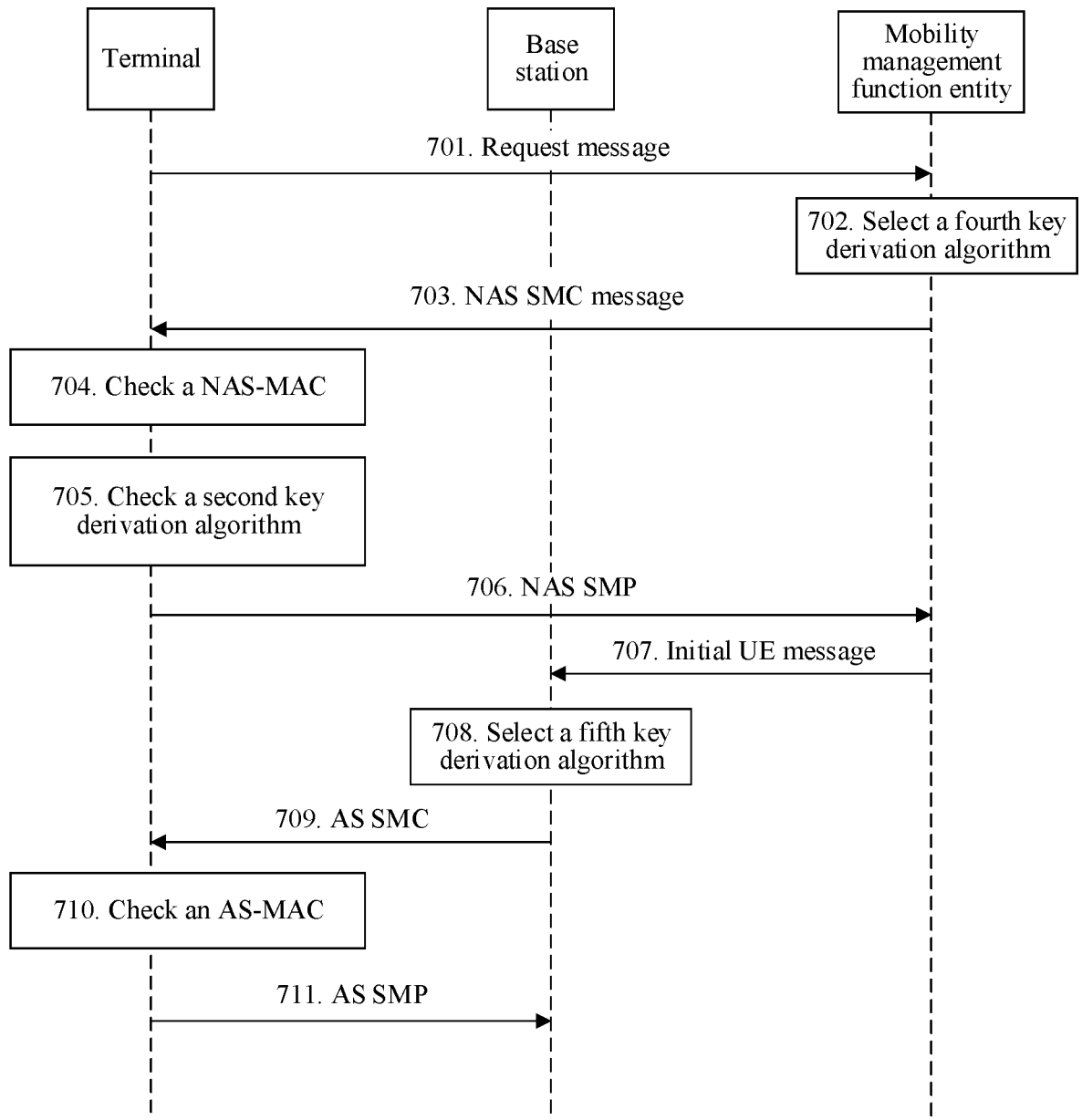
FIG. 7 shows another key derivation algorithm negotiation method according to an embodiment.

The negotiation process of the key derivation algorithm between the terminal and the storage function entity is described in the foregoing embodiment. FIG. 7 is a schematic diagram of a key derivation algorithm that is negotiated between a terminal and a mobility management function entity according to an embodiment of this application. This embodiment is a specific implementation method, and names of messages in actual use may alternatively be referred to as other names. This is not limited in this application.

Step 701. The terminal sends a request message to a mobility management function entity, and the mobility management function entity receives the request message from the terminal.

The request message may be an attach request message or a tracking area update request message in 4G, or a registration request message in 5G.

The request message includes a first key derivation algorithm, the first key derivation algorithm is at least one key derivation algorithm supported by the terminal, and the first key derivation algorithm is also referred to as capabilities of the key derivation algorithm supported by the terminal.

The terminal sends the first key derivation algorithm, and the mobility management function entity receives a second key derivation algorithm, where the second key derivation algorithm is at least one key derivation algorithm that is received by the mobility management function entity and that is supported by the terminal.

The second key derivation algorithm may be the same as, or may be different from, the first key derivation algorithm. For example, when being tampered with by an attacker, the second key derivation algorithm is different from the first key derivation algorithm. For a specific description, refer to the related description in step 301 of the foregoing embodiment. Details are not described again.

Step 702. The mobility management function entity selects a fourth key derivation algorithm from the second key derivation algorithm.

The selected fourth key derivation algorithm is used as the negotiated key derivation algorithm between the terminal and the mobility management function entity. For example, the mobility management function entity selects, based on the second key derivation algorithm and an algorithm priority list preconfigured by the mobility management function entity, one key derivation algorithm having a highest priority as the fourth key derivation algorithm.

The fourth key derivation algorithm in a specific implementation may be an identifier of the fourth key derivation algorithm.

Further, the mobility management function entity further performs, based on a NAS integrity protection key, integrity protection on a NAS SMC message, to generate a NAS-MAC. The NAS SMC message includes the fourth key derivation algorithm, the second key derivation algorithm, the NAS-MAC, and the like.

Step 703. The mobility management function entity sends a NAS SMC message to the terminal, and the terminal receives the NAS SMC message from the mobility management function entity.

Step 704. The terminal checks a received NAS-MAC.

After receiving the NAS SMC message, the terminal checks the NAS-MAC based on the NAS integrity protection key, to determine whether the message is tampered with.

If it is determined that the message is not tampered with, step 705 is performed; and if it is determined that the message is tampered with, for example, the checking process is initiated again based on the prior art.

Step 705. The terminal checks the second key derivation algorithm.

The terminal checks whether the second key derivation algorithm is the same as the first key derivation algorithm. If the two are the same, it indicates that the first key derivation algorithm sent by the terminal to the mobility management function entity is not tampered with, and the fourth key derivation algorithm is used as a negotiation result of the key derivation algorithm between the terminal and the mobility management function entity; and if the two are different, it indicates that the first key derivation algorithm sent by the terminal to the mobility management function entity is tampered with.

Step 706. The terminal sends a NAS SMP message to the mobility management function entity, and the mobility management function entity receives the NAS SMP message from the terminal.

The NAS SMP message is used to notify the negotiation result of the algorithm. If the negotiation is successful, the NAS SMP message notifies that the negotiation on the key derivation algorithm between the terminal and the mobility management function entity is completed, and NAS security is activated. If the negotiation fails, a renegotiation process may be initiated by using the NAS SMP message, and is described in detail below.

Optionally, a process in which the key derivation algorithm is negotiated between the terminal and a base station is further included, including the following step 708 to step 711.

Step 707. The mobility management function entity sends an initial UE message (Initial UE message) to a base station, and the base station receives the initial UE message from the mobility management function entity.

The initial UE message includes the second key derivation algorithm.

Step 708. The base station selects a fifth key derivation algorithm.

The base station selects, based on the second key derivation algorithm received in step 707, and an algorithm priority list preconfigured by the base station, one key derivation algorithm having a highest priority from the second key derivation algorithm, that is, the fifth key derivation algorithm, as the key derivation algorithm negotiated between the terminal and the base station.

Then, the base station performs, based on an access stratum (AS) integrity protection key, integrity protection on an AS SMC message, to generate an AS-MAC.

Step 709. The base station sends an AS SMC message to the terminal, and the terminal receives the AS SMC message from the base station.

The AS SMC message includes the AS-MAC and the fifth key derivation algorithm.

Step 710. The terminal checks an AS-MAC.

The terminal checks the AS-MAC based on the AS integrity protection key, to determine whether the message is tampered with. If it is determined that the message is not tampered with, the fifth key derivation algorithm is used as the key derivation algorithm negotiated between the terminal and the base station.

Step 711. The terminal sends an AS SMP message to the base station, and the base station receives the AS SMP message from the terminal.

The AS SMP message is used to notify the negotiation result of the algorithm. If the negotiation is successful, the AS SMP message notifies that the negotiation on the key derivation algorithm between the terminal and the base station is completed, and AS security is activated. If the negotiation fails, the AS SMP message notifies that the negotiation on the key derivation algorithm between the terminal and the base station fails.

In the foregoing embodiment, the terminal checks the sent first key derivation algorithm and the received second key derivation algorithm; if the checking is correct and the first key derivation algorithm is the same as the second key derivation algorithm, the terminal determines that the first key derivation algorithm sent by the terminal is not tampered with by the attacker; and then uses the fourth key derivation algorithm negotiated between the terminal and the mobility management function entity as a key derivation algorithm of the terminal, and uses the fifth key derivation algorithm negotiated between the terminal and the base station as a key derivation algorithm of the terminal, to ensure confidentiality of the negotiated key derivation algorithm, thereby improving communication security.

In the foregoing embodiment, the method in which the key derivation algorithm is negotiated between the terminal and the storage function entity is described, and the method in which the key derivation algorithm is negotiated between the terminal and the mobility management function entity is described.

Several other key derivation algorithm negotiation methods are described below, to be used for the processing of a negotiation failure of the key derivation algorithm in the foregoing embodiment.

For example, in the embodiment shown in FIG. 3, the key derivation algorithm is negotiated between the terminal and the storage function entity. After the second message authentication code is generated in step 304, the terminal determines that the first message authentication code is the same as the second message authentication code, and the first key derivation algorithm is different from the second key derivation algorithm, so that the third key derivation algorithm is not used as a key derivation algorithm of the terminal. However, a default key derivation algorithm is selected as the key derivation algorithm of the terminal, and the key is derived based on the default key derivation algorithm. Certainly, in another implementation, alternatively, the third key derivation algorithm may first be used as a key derivation algorithm of the terminal, and the key is derived based on the third key derivation algorithm. Further, a renegotiation process of the key derivation algorithm is initiated again, or the terminal disconnects a current radio access network and accesses the current radio access network again. In this application, for example, a renegotiation process of the key derivation algorithm is initiated.

For another example, in the embodiment shown in FIG. 6, the key derivation algorithm is negotiated between the terminal and the storage function entity. In step 609, the terminal checks that the first key derivation algorithm is different from the second key derivation algorithm, so that the request message sent in step 601 may be carried in the NAS SMP sent in step 610, where the request message includes the first key derivation algorithm, to initiate the renegotiation process of the key derivation algorithm again; or the terminal disconnects the current radio access network and accesses the current radio access network again. In this application, for example, a renegotiation process of the key derivation algorithm is initiated.

For another example, in the embodiment shown in FIG. 7, the key derivation algorithm is negotiated between the terminal and the mobility management function entity. In step 705, the NAS-MAC is checked to be correct. However, the second key derivation algorithm is checked to be different from the first key derivation algorithm, so that the fourth key derivation algorithm is not used as a key derivation algorithm between the terminal and the mobility management function entity. However, a default key derivation algorithm is selected as the key derivation algorithm between the terminal and the mobility management function entity. Certainly, in another implementation, alternatively, the fourth key derivation algorithm may first be used as the key derivation algorithm of the terminal, and the key is derived based on the fourth key derivation algorithm. Further, the request message sent in step 701 is carried in the AS SMP sent in step 711, where the request message includes the first key derivation algorithm, to initiate the renegotiation process of the key derivation algorithm again; or the terminal disconnects the current radio access network and accesses the current radio access network again. In this application, for example, a renegotiation process of the key derivation algorithm is initiated.

The renegotiation process of the key derivation algorithm is specifically described in the following three cases.

Case 1: The key derivation algorithm is renegotiated between the terminal and the mobility management function entity.

Figure 8:
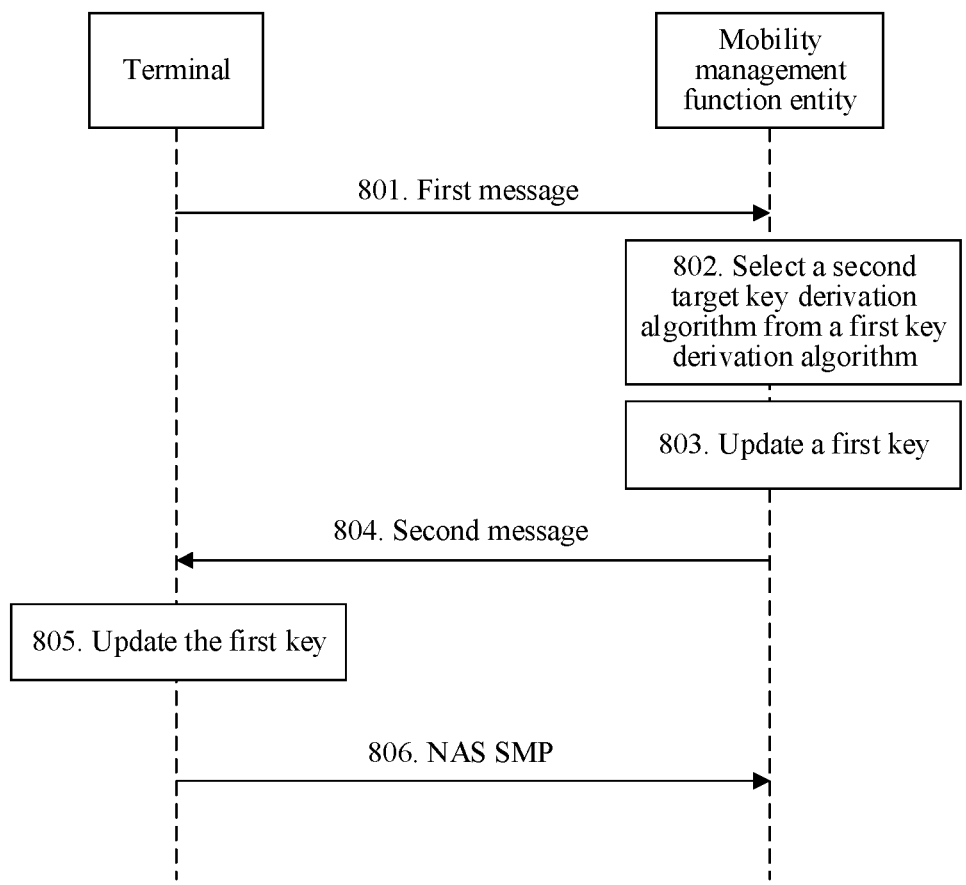
FIG. 8 shows another key derivation algorithm negotiation method according to an embodiment.

FIG. 8 shows a key derivation algorithm negotiation method according to an embodiment of this application, to renegotiate the key derivation algorithm between the terminal and the mobility management function entity. The process shown in FIG. 8 may be completed after step 706 in the process shown in FIG. 7. In other words, after step 706 in FIG. 7, the following steps are further included.

Step 801. The terminal sends a first message to the mobility management function entity, and the mobility management function entity receives the first message from the terminal.

Step 801 may be step 706, that is, the first message may be the NAS SMP message and includes the first key derivation algorithm.

It should be noted that the first message is protected by the integrity protection algorithm, so that the first key derivation algorithm included in the first message is not tampered with by the attacker. Therefore, the mobility management function entity also receives the first key derivation algorithm.

Step 802. The mobility management function entity selects a second target key derivation algorithm from the first key derivation algorithm.

For the method for selecting the second target key derivation algorithm, refer to the foregoing method for selecting the third key derivation algorithm from the second key derivation algorithm. Details are not described again.

Step 803. The mobility management entity updates a first key stored in the mobility management function entity based on the second target key derivation algorithm.

In an implementation, the mobility management function entity may first generate a second random number, and generate a new first key based on the generated second random number and the second target key derivation algorithm, and then update the first key stored in the mobility management function entity by using the generated new first key.

The first key is used for the terminal and the mobility management function entity to communicate. For example, the first key may be a Knas, and may specifically include an encryption key (Knas-enc/KNASenc), and an integrity protection key (Knas-int/KNAS-int).

For example, in 4G, the encryption key is referred to as a Knas-enc, and the integrity protection key is referred to as a Knas-int.

In 5G, the encryption key is referred to as a KNASenc, and the integrity protection key is referred to as a KNASint.

For example, in 4G, a new Kasme is first generated based on the second random number, a locally stored Kasme, and the second target key derivation algorithm; and a new Knas-int is then generated based on the new Kasme, the second target key derivation algorithm, and an integrity protection algorithm. In addition, a new Knas-enc is generated based on the new Kasme, the second target key derivation algorithm, and an encryption algorithm.

For another example, in 5G, a new Kamf is first generated based on the second random number, a Kamf, and the second target key derivation algorithm; and a new KNASint is then generated based on the new Kamf, the second target key derivation algorithm, and an integrity protection algorithm. In addition, a new KNASenc is generated based on the new Kamf, the second target key derivation algorithm, and an encryption algorithm.

In another implementation, the mobility management function entity may generate a new first key based on a NAS count COUNT and the second target key derivation algorithm, and then update the first key stored in the mobility management function entity by using the generated new first key.

The first message may include some bits of an uplink NAS COUNT, and an AMF entity may obtain an entire NAS COUNT based on some bits of the uplink NAS COUNT included in the first message. The first key is used for the terminal and the mobility management function entity to communicate. For example, the first key may be a Knas, and may specifically include an encryption key (Knas-enc/KNASenc), and an integrity protection key (Knas-int/KNASint).

For example, in 4G, an entire NAS COUNT is first obtained based on some bits of the NAS COUNT; a new Kasme is then generated based on the NAS COUNT, a locally stored Kasme, and the second target key derivation algorithm; and a new Knas-int is then generated based on the new Kasme, the second target key derivation algorithm, and an integrity protection algorithm. In addition, a new Knas-enc is generated based on the new Kasme, the second target key derivation algorithm, and an encryption algorithm.

For another example, in 5G, an entire NAS COUNT is first obtained based on some bits of the NAS COUNT; a new Kamf is then generated based on the NAS COUNT, a Kamf, and the second target key derivation algorithm; and a new KNASint is then generated based on the new Kamf, the second target key derivation algorithm, and an integrity protection algorithm. In addition, a new KNASenc is generated based on the new Kamf, the second target key derivation algorithm, and an encryption algorithm.

In another implementation, the mobility management function entity may generate a new first key based on a NAS count COUNT, the second target key derivation algorithm, and a constant character string, and then update the first key stored in the mobility management function entity by using the generated new first key.

The first message may include some bits of an uplink NAS COUNT, and an AMF entity may obtain an entire NAS COUNT based on some bits of the uplink NAS COUNT included in the first message. The first key is used for the terminal and the mobility management function entity to communicate. For example, the first key may be a Knas, and may specifically include an encryption key (Knas-enc/KNASenc), and an integrity protection key (Knas-int/KNASint). The constant character string may be a preconfigured constant character string, for example, a "KDF", or a "KDF-UPDATE".

For example, in 4G, an entire NAS COUNT is first obtained based on some bits of the NAS COUNT; a new Kasme is then generated based on the NAS COUNT, a locally stored Kasme, the second target key derivation algorithm, and the constant character string; and a new Knas-int is then generated based on the new Kasme, the second target key derivation algorithm, and an integrity protection algorithm. In addition, a new Knas-enc is generated based on the new Kasme, the second target key derivation algorithm, and an encryption algorithm.

For another example, in 5G, an entire NAS COUNT is first obtained based on some bits of the NAS COUNT; a new Kamf is then generated based on the NAS COUNT, a Kamf, the second target key derivation algorithm, and the constant character string; and a new KNASint is then generated based on the new Kamf, the second target key derivation algorithm, and an integrity protection algorithm. In addition, a new KNASenc is generated based on the new Kamf, the second target key derivation algorithm, and an encryption algorithm.

Step 804. The mobility management entity sends a second message to the terminal, and the terminal receives the second message from the mobility management entity.

The second message may be a NAS SMC message, and is integrity protected, to prevent from being tampered with the content of the message by an attacker.

The second message includes the second target key derivation algorithm, and optionally, further includes the second random number.

Step 805. The terminal updates the first key.

The terminal obtains the second target derivation algorithm from the received second message, updates the key derivation algorithm of the terminal by using the second target derivation algorithm, and updates the first key based on the second target key derivation algorithm.

Optionally, if the second message includes the second random number, the terminal updates the first key based on the second target key derivation algorithm and the second random number.

Optionally, the terminal may further update the first key based on the second target key derivation algorithm and a NAS COUNT. The first message in step 801 includes some bits of the NAS COUNT.

Optionally, the terminal may further update the first key based on the second target key derivation algorithm, a constant character string, and a NAS COUNT. The first message in step 801 includes some bits of the NAS COUNT.

For three specific methods of updating the first key by the terminal, refer to the process of updating the first key by the mobility management entity in step 803.

Details are not described again.

Step 806. The terminal sends a NAS SMP message to the mobility management entity, and the mobility management entity receives the NAS SMP message from the terminal.

The NAS SMP message is used to notify the mobility management entity that the negotiation and updating of the first key is a success.

Case 2: The key derivation algorithm is renegotiated between the terminal and the storage function entity.

Figure 9:
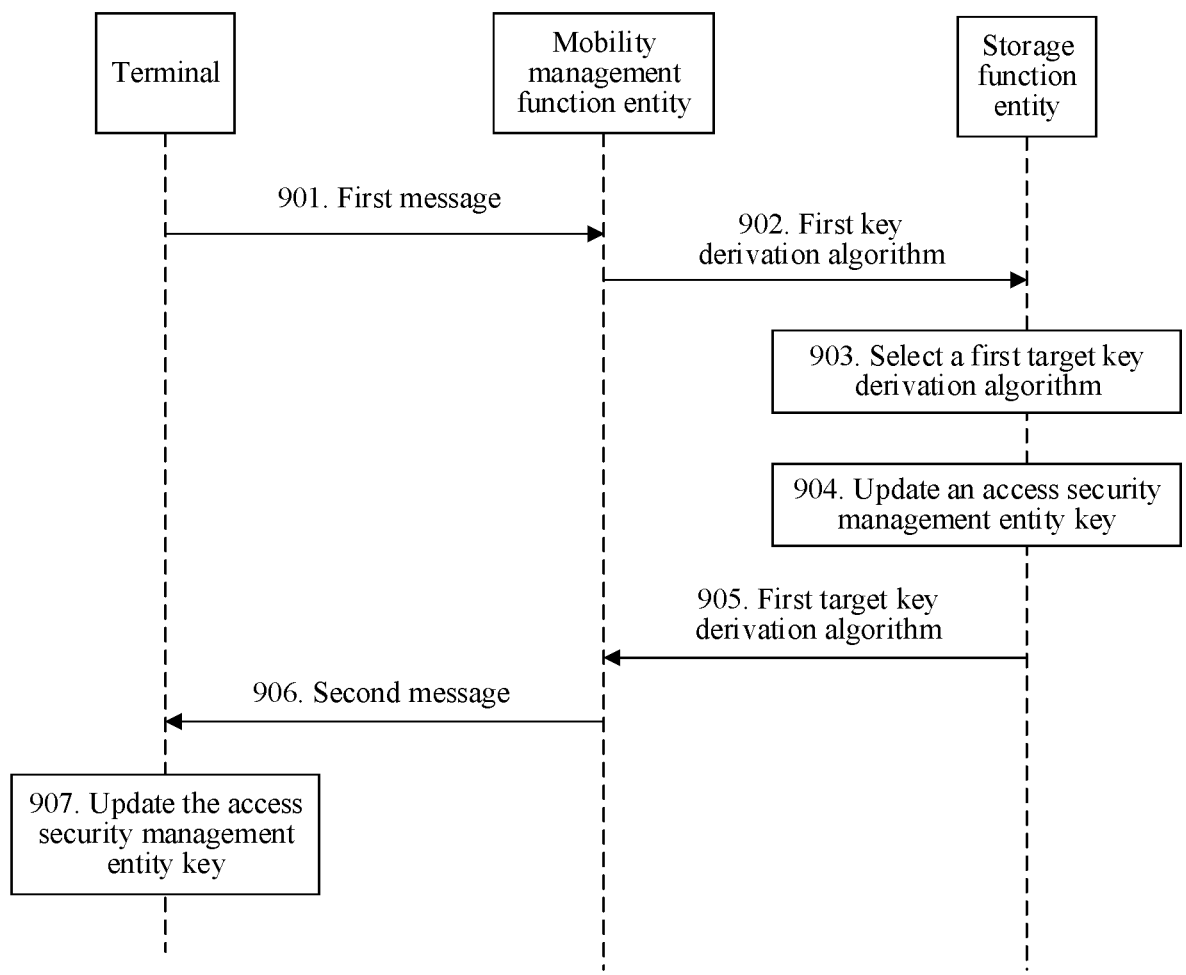
FIG. 9 shows another key derivation algorithm negotiation method according to an embodiment.

FIG. 9 shows a key derivation algorithm negotiation method according to an embodiment of this application, to renegotiate the key derivation algorithm between the terminal and the storage function entity. The process shown in FIG. 9 may be completed after step 304 in the process shown in FIG. 3. In other words, after step 304 in FIG. 3, if it is determined that a first key derivation algorithm is different from a second key derivation algorithm, the following steps are further included.

Step 901. The terminal sends a first message to the mobility management function entity, and the mobility management function entity receives the first message from the terminal.

The first message may be a NAS SMP message and includes the first key derivation algorithm.

It should be noted that the first message is protected by the integrity protection algorithm, so that the first key derivation algorithm included in the first message is not tampered with by the attacker. Therefore, the mobility management function entity also receives the first key derivation algorithm.

Step 902. The mobility management entity sends the first key derivation algorithm to the storage function entity, and the storage function entity receives the first key derivation algorithm from the mobility management entity.

Step 903. The storage function entity selects a first target key derivation algorithm from the first key derivation algorithm.

For the method for selecting the first target key derivation algorithm, refer to the foregoing method for selecting the third key derivation algorithm from the second key derivation algorithm. Details are not described again.

Step 904. The storage function entity updates an access security management entity key.

In 4G, the access security management entity key may be referred to as a Kasme, and in 5G, the name may be different from that in 4G, for example, the access security management entity key is referred to as a Kasme* in 5G implementations.

In an implementation, the storage function entity may first generate a first random number, and generate a new access security management entity key based on the generated first random number, the first target key derivation algorithm, and a stored access security management entity key, and then update the access security management entity key stored in the storage function entity.

Step 905. The storage function entity sends the first target key derivation algorithm to the mobility management function entity, and the mobility management function entity receives the first target key derivation algorithm from the storage function entity.

Optionally, in step 905, the storage function entity further sends the first random number to the mobility management function entity.

Step 906. The mobility management entity sends a second message to the terminal, and the terminal receives the second message from the mobility management entity.

The second message may be a NAS SMC message, and is integrity protected, to prevent from being tampered with the content of the message by an attacker.

The second message includes the first target key derivation algorithm, and optionally, further includes the first random number.

Step 907. The terminal updates the access security management entity key stored in the terminal.

The terminal obtains the first target derivation algorithm from the received second message, updates the key derivation algorithm of the terminal by using the first target derivation algorithm, and updates the access security management entity key based on the first target key derivation algorithm. Optionally, the access security management entity key is updated based on the first target key derivation algorithm and the first random number. For a specific method, refer to the process of updating the first key by the mobility management entity in step 904. Details are not described again.

Case 3: The key derivation algorithm is renegotiated between the terminal and the mobility management function entity; and the key derivation algorithm is renegotiated between the terminal and the storage function entity.

Figure 10:
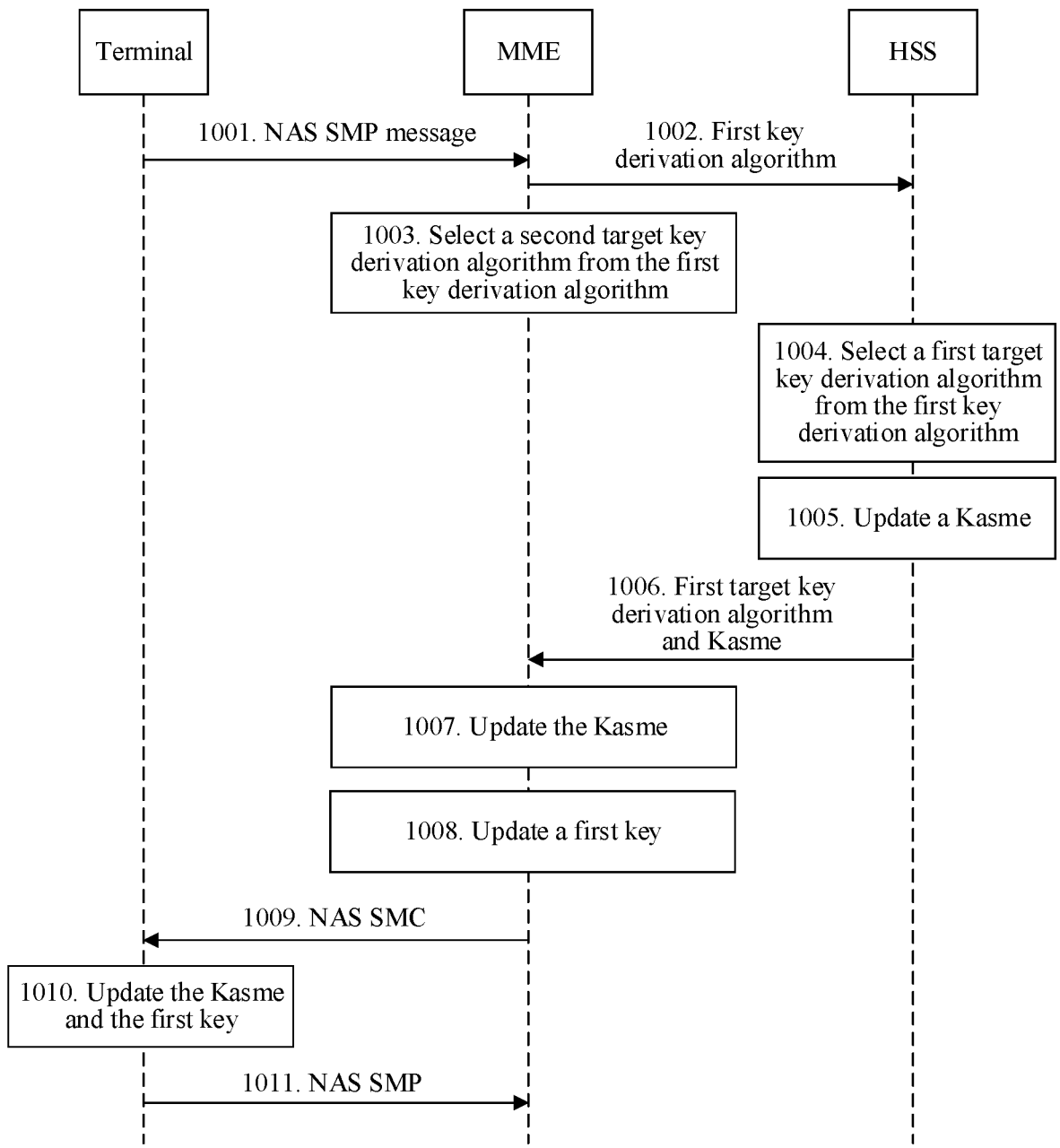
FIG. 10 shows another key derivation algorithm negotiation method according to an embodiment.

FIG. 10 shows a key derivation algorithm negotiation method according to an embodiment of this application, to renegotiate the key derivation algorithm between the terminal and the storage function entity, and to renegotiate the key derivation algorithm between the terminal and the mobility management function entity. The process shown in FIG. 10 may be a combination of the process shown in FIG. 8 with the process shown in FIG. 9, and FIG. 10 is described by using 4G as an example. The MME in FIG. 10 is the mobility management function entity, and the HSS entity is the storage function entity. The process shown in FIG. 10 includes the following steps.

Step 1001. The terminal sends a NAS SMP message to the MME, and the MME receives the NAS SMP message from the terminal.

The NAS SMP message includes a first key derivation algorithm, and the first key derivation algorithm is at least one key derivation algorithm supported by the terminal.

Step 1002. The MME sends a first key derivation algorithm to the HSS, and the HSS receives the first key derivation algorithm from the MME.

Step 1003. The MME selects a second target key derivation algorithm from a first target key derivation algorithm.

Step 1004. The HSS selects the first target key derivation algorithm from the first target key derivation algorithm.

Step 1005. The HSS updates a Kasme.

For example, the HSS generates a first random number, generates a new Kasme based on the first random number, a locally stored Kasme, and the first target key derivation algorithm, and updates the locally stored Kasme by using the new Kasme.

Step 1006. The HSS sends the first target key derivation algorithm and a new Kasme to the MME.

Optionally, the HSS further sends the first random number.

Step 1007. The MME updates a locally stored Kasme based on the received Kasme.

In other words, the received Kasme is used to replace the locally stored Kasme.

Optionally, if a new Kasme is not included in step 1006, the method for updating a locally stored Kasme in step 1007 is as follows.

The MME generates a second random number, and generates a new Kasme based on the second random number, a locally stored Kasme, and the second target key derivation algorithm.

Step 1008. The MME updates a first key.

Specifically, the MME generates a new Knas-enc based on the updated Kasme, the second target key derivation algorithm, and an encryption algorithm.

A new Knas-int is generated based on the new Kasme, the second target key derivation algorithm, and an integrity protection algorithm.

The first key is a key used for the terminal and the MME to communicate, including the Knas-int and the Knas-enc.

Step 1009. The MME sends a NAS SMC message to the terminal, and the terminal receives the NAS SMC message from the MME.

The NAS SMC message includes the first target key derivation algorithm and the second target key derivation algorithm, and optionally, further includes the first random number, and the second random number.

Step 1010. The terminal updates the Kasme and the first key.

In one aspect, the terminal uses the received first target key derivation algorithm and the second target key derivation algorithm as the key of the terminal. The first target key derivation algorithm is used for the terminal and the HSS to communicate, and the second target key derivation algorithm is used for the terminal and the MME to communicate.

The method for updating the Kasme by the terminal is the same as the method for updating the Kasme by the HSS, and the method for updating the first key by the terminal is the same as the method for updating the first key by the MME. Details are not described again.

Step 1011. The terminal sends a NAS SMP message to the MME, and the mobility management entity receives the NAS SMP message from the terminal.

The NAS SMP message is used to notify the MME that the negotiation and updating of the key is a success.

For detailed implementation methods of the foregoing steps, refer to the detailed description of the related parts in the foregoing embodiments. Details are not described herein again.

It should be noted that, there is no strict execution sequences between the foregoing steps. For example, step 1002 may be performed before step 1003, step 1004 and step 1005 are performed before step 1003, or step 1003 is performed between step 1004 and step 1005.

Figure 11:
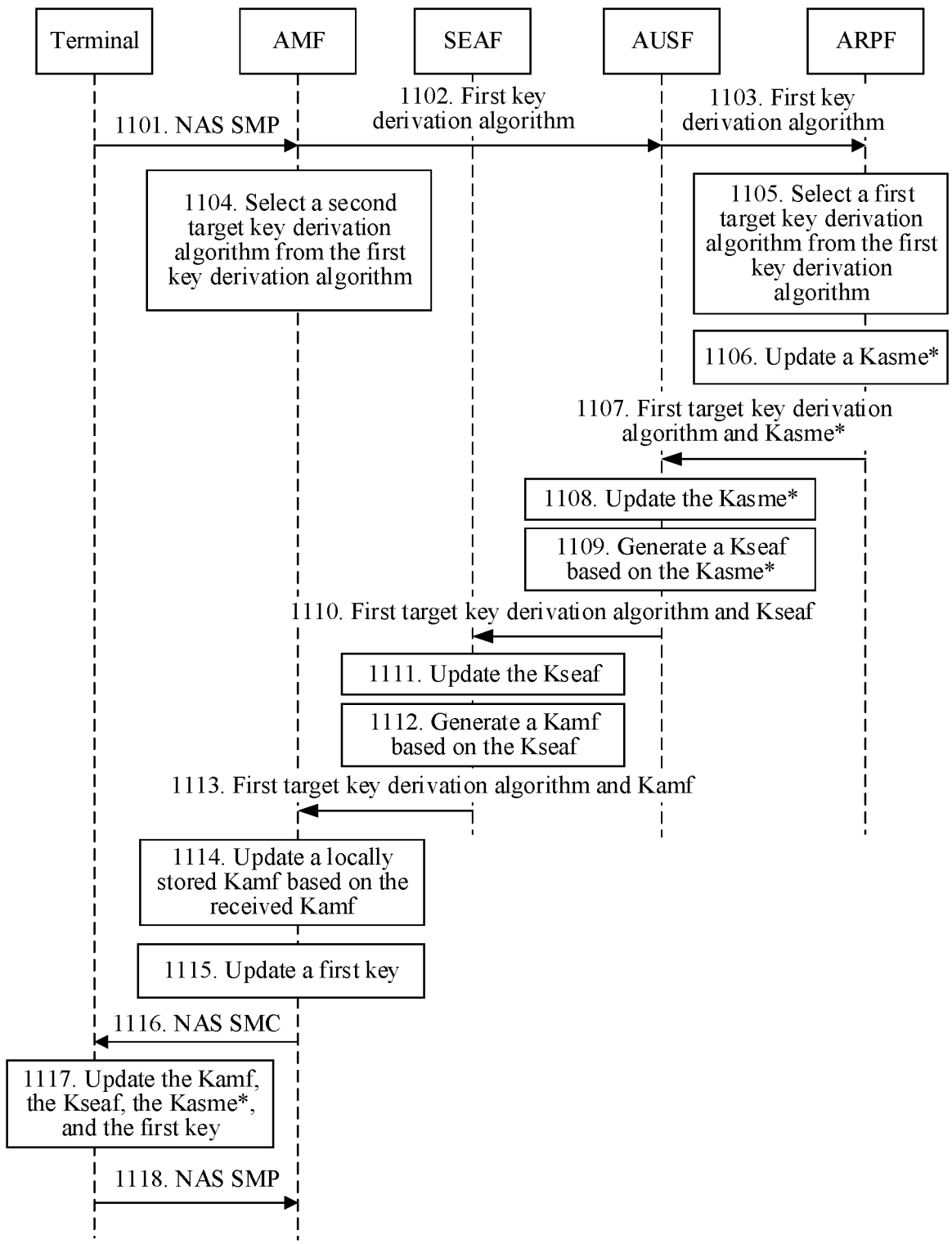
FIG. 11 shows another key derivation algorithm negotiation method according to an embodiment.

FIG. 11 shows a key derivation algorithm negotiation method according to an embodiment of this application, to renegotiate the key derivation algorithm between the terminal and the storage function entity, and to renegotiate the key derivation algorithm between the terminal and the mobility management function entity. The process shown in FIG. 11 includes parts of the process in FIG. 8, and parts of the process in FIG. 9. FIG. 11 is described by using 5G as an example. The AMF entity in FIG. 11 is the mobility management function entity, and the ARPF entity is the storage function entity. The process shown in FIG. 11 includes the following steps.

Step 1101. The terminal sends a NAS SMP message to the AMF, and the AMF receives the NAS SMP message from the terminal.

The NAS SMP message includes a first key derivation algorithm, and the first key derivation algorithm is at least one key derivation algorithm supported by the terminal.

Step 1102. The AMF sends a first key derivation algorithm to an AUSF, and the AUSF receives the first key derivation algorithm from the AMF.

Step 1103. The AUSF sends the first key derivation algorithm to the ARPF, and the ARPF receives the first key derivation algorithm from the AUSF.

Step 1104. The AMF selects a second target key derivation algorithm from the first key derivation algorithm.

Step 1105. The ARPF selects a first target key derivation algorithm from the first key derivation algorithm.

Step 1106. The ARPF updates a Kasme*.

The ARPF generates a new Kasme* based on a locally stored Kasme* and the first target key derivation algorithm, and updates the locally stored Kasme* by using the new Kasme*.

Optionally, the ARPF generates a first random number, then generates a new Kasme* based on the first random number, a locally stored Kasme*, and the first target key derivation algorithm, and updates the locally stored Kasme* by using the new Kasme*.

Step 1107. The ARPF sends the first target key derivation algorithm and a new Kasme* to the AUSF.

Optionally, when the ARPF updates the Kasme* based on the generated first random number, the ARPF further sends the first random number to the AUSF.

Step 1108. The AUSF updates a locally stored Kasme* based on the received Kasme*.

In other words, the received Kasme* is used to replace the locally stored Kasme*.

Step 1109. The AUSF generates a Kseaf based on the Kasme*.

For example, the kseaf is generated by the AUSF and sent to an SEAF. The Kseaf may be configured to obtain a key Kamf used by the AMF.

Step 1110. The AUSF sends the first target key derivation algorithm and the Kseaf to an SEAF.

Optionally, when the first random number is included in step 1107, the AUSF further sends the first random number to the SEAF.

Step 1111. The SEAF updates a locally stored Kseaf based on the received Kseaf.

Step 1112. The SEAF generates a Kamf based on the updated Kseaf

Step 1113. The SEAF sends the first target key derivation algorithm and the Kamf to the AMF.

Optionally, when the first random number is included in step 1110, the SEAF further sends the first random number to the AMF.

Step 1114. The AMF updates a locally stored Kamf based on the received Kamf.

Step 1115. The AMF updates a first key.

Specifically, the AMF generates a new KNASenc based on the updated Kamf, the second target key derivation algorithm, and an encryption algorithm.

A new KNASint is generated based on the updated Kamf, the second target key derivation algorithm, and an integrity protection algorithm.

The first key is a key used for the terminal and the AMF to communicate, including the KNASenc and the KNASint.

Step 1116. The AMF sends a NAS SMC message to the terminal, and the terminal receives the NAS SMC message from the AMF.

The NAS SMC message includes the first target key derivation algorithm and the second target key derivation algorithm.

Optionally, when the first random number is included in step 1113, the NAS SMC message further includes the first random number.

Step 1117. The terminal updates the locally stored Kamf, the Kseaf, the Kasme*, and the first key.

The terminal generates a new Kasme* based on the locally stored Kasme* and the first target key derivation algorithm, and updates the locally stored Kasme* by using the new Kasme*.

Optionally, when the terminal receives the first random number, the terminal generates a new Kasme* based on the first random number, the locally stored Kasme*, and the first target key derivation algorithm, and updates the locally stored Kasme* by using the new Kasme*.

The terminal generates a new Kseaf based on the updated Kasme*, and updates the locally stored Kseaf based on the new Kseaf.

The terminal generates a new Kamf based on the new Kseaf, and updates the locally stored Kamf based on the new Kamf.

The terminal generates a new KNASenc based on the updated Kamf, the second target key derivation algorithm, and the encryption algorithm.

The terminal generates a new KNASint based on the updated Kamf, the second target key derivation algorithm, and the integrity protection algorithm.

The new KNASenc and the new KNASint are collectively referred to as the updated first key.

Step 1118. The terminal sends a NAS SMP message to the AMF, and the AMF receives the NAS SMP message from the terminal.

The NAS SMP message is used to notify the AMF that the negotiation and updating of the key is a success.

For detailed implementation methods of the foregoing steps, refer to the detailed description of the related parts in the foregoing embodiments. Details are not described herein again.

It should be noted that, there is no strict execution sequences between the foregoing steps. For example, step 1102 and step 1103 may be performed before step 1104, and there is no limitation on the execution sequences between step 1104 and step 1105 to step 1113.

The solutions provided in this application are described above mainly from a perspective of interaction between network elements. It may be understood that to implement the foregoing functions, each network element includes a corresponding hardware structure and/or software module for performing each function. A person skilled in the art should be easily aware that in combination with units and algorithm steps in the examples described in the embodiments disclosed in this specification, the present invention can be implemented by hardware or a combination of hardware and computer software. Whether a function is performed in a hardware manner or a manner of driving hardware by computer software depends on particular applications and design constraint conditions of the technical solutions. A skilled person may use different methods to implement the described functions for each particular application, but it should not be considered that the implementation goes beyond the scope of the present invention.

Figure 12:
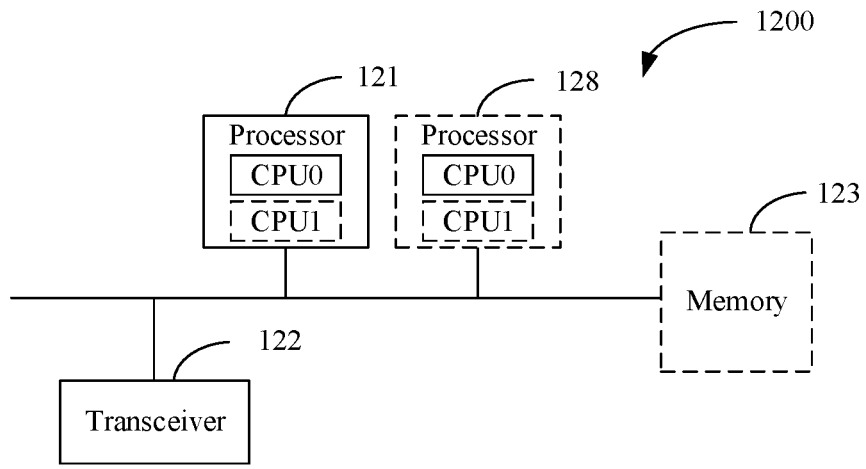
FIG. 12 is a schematic diagram of an apparatus according to an embodiment.

Based on same inventive ideas, FIG. 12 is a schematic diagram of an apparatus according to this application. The apparatus may be a terminal, and may perform the method performed by the terminal in any one of the embodiments.

The terminal 1200 includes at least one processor 121 and a transceiver 122, and optionally, further includes a memory 123. The processor 121, the transceiver 122, and the memory 123 are connected by using a communications bus.

The processor 121 may be a general-purpose central processing unit (CPU), a microprocessor, an application-specific integrated circuit (application-specific integrated circuit, ASIC), or one or more integrated circuits configured to control execution of a program in a solution of the present invention.

The communications bus may include a path for transmitting information between the foregoing units.

The transceiver 122 is configured to communicate with another device or communications network, and the transceiver includes a radio frequency circuit.

The memory 123 may be a read-only memory (read-only memory, ROM) or another type of static storage device that can store static information and an instruction, a random access memory (random access memory, RAM), or another type of dynamic storage device that can store information and an instruction; or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that is accessible by a computer, but is not limited thereto. The memory 123 may independently exist and is connected to the processor 121 by using the communications bus. The memory 123 may alternatively be integrated with the processor. The memory 123 is configured to store application program code for performing this solution of the present invention, and the processor 121 controls the performing. The processor 121 is configured to execute the application program code stored in the memory 123.

During specific implementation, in an embodiment, the processor 121 may include one or more CPUs, for example, a CPU0 and a CPU1 in FIG. 12.

During specific implementation, in an embodiment, the terminal 1200 may include a plurality of processors, for example, a processor 121 and a processor 128 in FIG. 12. Each of the processors may be a single-core (single-CPU) processor, or may be a multi-core (multi-CPU) processor. The processor herein may refer to one or more devices, circuits, and/or processing cores configured to process data (such as a computer program instruction).

It should be understood that, the terminal may be configured to implement steps performed by the terminal in the key derivation algorithm negotiation method according to the embodiments of the present invention. For related features, refer to the description above. Details are not described herein again.

Figure 13:
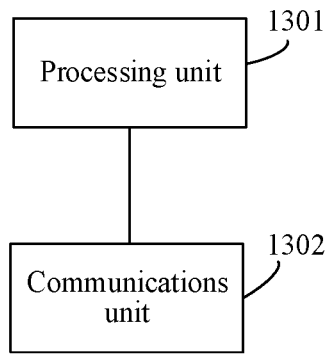
FIG. 13 is a schematic diagram of another apparatus according to an embodiment.

In this application, functional modules of the terminal may be divided according to the foregoing method examples. For example, functional modules may be divided corresponding to functions, or two or more functions may be integrated into one processing module. The foregoing integrated module may be implemented in a hardware form or a software functional module form. It should be noted that module division in this application is an example and is merely logical function division. During actual implementation, there may be another division manner. For example, when the functional modules are divided corresponding to the functions, FIG. 13 is a schematic diagram of an apparatus. The apparatus may be the terminal in the foregoing embodiments. The apparatus includes a processing unit 1301 and a communications unit 1302.

In one aspect, the communications unit 1302 is configured to send a first key derivation algorithm to a storage function entity, where the first key derivation algorithm is at least one key derivation algorithm supported by a terminal. The communications unit 1302 is further configured to receive an authentication token from the storage function entity, where the authentication token includes a first message authentication code, a second key derivation algorithm, and a third key derivation algorithm, the second key derivation algorithm is at least one key derivation algorithm that is received by the storage function entity and that is supported by the terminal, the second key derivation algorithm includes the third key derivation algorithm, and the first message authentication code is generated based on the second key derivation algorithm. The processing unit 1301 is configured to generate a second message authentication code based on the second key derivation algorithm. If the first message authentication code is the same as the second message authentication code, and the first key derivation algorithm is the same as the second key derivation algorithm, the processing unit 1301 is further configured to obtain the third key derivation algorithm as the key derivation algorithm of the terminal.

Optionally, the second key derivation algorithm is carried in an authentication management field of the authentication token.

In another aspect, if a first key derivation algorithm is different from a second key derivation algorithm, the communications unit 1302 is configured to send a first message to a mobility management function entity, where the first message includes the first key derivation algorithm, the first key derivation algorithm is at least one key derivation algorithm supported by a terminal, and the second key derivation algorithm is at least one key derivation algorithm that is received by the mobility management function entity or a storage function entity and that is supported by the terminal. The communications unit 1302 is further configured to receive a second message from the mobility management function entity, where the second message includes a target key derivation algorithm, and the first key derivation algorithm includes the target key derivation algorithm. The processing unit 1301 is configured to:

update a key derivation algorithm of the terminal to the target key derivation algorithm, and update a key of the terminal based on the target key derivation algorithm.

Optionally, the target key derivation algorithm includes a first target key derivation algorithm from the storage function entity, and the processing unit 1301 is specifically configured to update an access security management entity key of the terminal based on the first target key derivation algorithm.

Optionally, the second message further includes a first random number from the storage function entity. The processing unit 1301 is specifically configured to update the access security management entity key based on the first target key derivation algorithm and the first random number.

Optionally, the target key derivation algorithm includes a second target key derivation algorithm from the mobility management function entity, and the processing unit 1301 is specifically configured to update, based on the second target key derivation algorithm, a first key used for communication between the terminal and the mobility management function entity.

Optionally, the second message further includes a second random number from the mobility management function entity, and the processing unit 1301 is specifically configured to update the first key based on the second target key derivation algorithm and the second random number.

Optionally, the communications unit 1302 is further configured to receive a non-access stratum NAS security mode complete SMP message from the mobility management function entity, where the NAS SMP message includes the second key derivation algorithm; and the second key derivation algorithm is a key derivation algorithm that is received by the storage function entity and that is supported by the terminal; and the processing unit 1301 is further configured to determine that the first key derivation algorithm is different from the second key derivation algorithm.

Optionally, the first message is the NAS SMP message, and the second message is a NAS security mode command SMC message.

It should be understood that, the terminal may be configured to implement steps performed by the terminal in the key derivation algorithm negotiation method according to the embodiments of the present invention. For related features, refer to the description above. Details are not described herein again.

Figure 14:
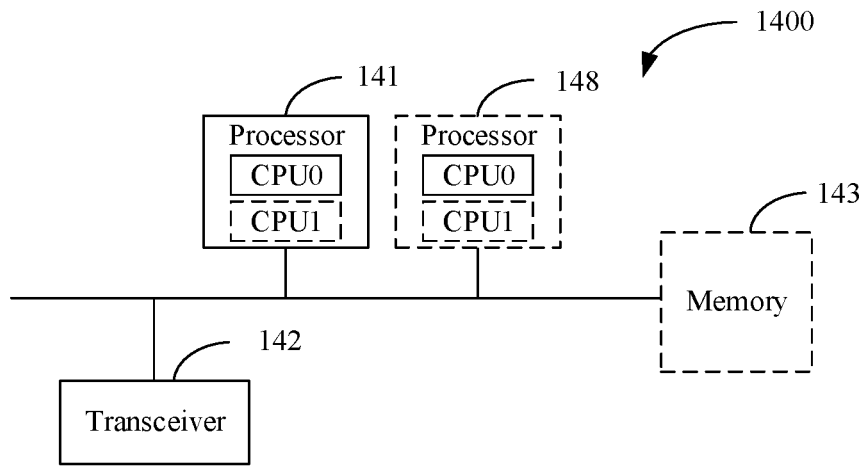
FIG. 14 is a schematic diagram of another apparatus according to an embodiment.

Based on same inventive ideas, FIG. 14 is a schematic diagram of an apparatus according to this application. The apparatus may be, for example, a mobility management function entity or a storage function entity, and may perform the method performed by the mobility management function entity or the storage function entity in any one of the embodiments.

The mobility management function entity or the storage function entity 1400 includes at least one processor 141 and a transceiver 142, and optionally, further includes a memory 143. The processor 141, the transceiver 142, and the memory 143 are connected by using a communications bus.

The processor 141 may be a general-purpose central processing unit (CPU), a microprocessor, an application-specific integrated circuit (application-specific integrated circuit, ASIC), or one or more integrated circuits configured to control execution of a program in a solution of the present invention.

The communications bus may include a path for transmitting information between the foregoing units.

The transceiver 142 is configured to communicate with another device or communications network, and the transceiver includes a radio frequency circuit.

The memory 143 may be a read-only memory (ROM) or another type of static storage device that can store static information and an instruction, a random access memory (RAM), or another type of dynamic storage device that can store information and an instruction; or may be an electrically erasable programmable read-only memory (EEPROM), a compact disc read-only memory (compact disc read-only memory, CD-ROM) or another compact disc storage medium, optical disc storage medium (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that is accessible by a computer, but is not limited thereto. The memory 143 may independently exist and is connected to the processor 141 by using the communications bus. The memory 143 may alternatively be integrated with the processor. The memory 143 is configured to store application program code for performing this solution of the present invention, and the processor 141 controls the performing. The processor 141 is configured to execute the application program code stored in the memory 143.

During specific implementation, in an embodiment, the processor 141 may include one or more CPUs, for example, a CPU0 and a CPU1 in FIG. 14.

During specific implementation, in an embodiment, the mobility management function entity or the storage function entity 1400 may include a plurality of processors, for example, a processor 141 and a processor 148 in FIG. 14. Each of the processors may be a single-core (single-CPU) processor, or may be a multi-core (multi-CPU) processor. The processor herein may refer to one or more devices, circuits, and/or processing cores configured to process data (such as a computer program instruction).

It should be understood that, the mobility management function entity or the storage function entity may be configured to implement steps performed by the mobility management function entity or the storage function entity in the key derivation algorithm negotiation method according to the embodiments of the present invention. For related features, refer to the description above. Details are not described herein again.

Figure 15:
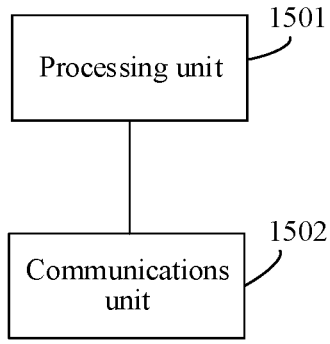
FIG. 15 is a schematic diagram of another apparatus according to an embodiment.

In this application, functional modules of the mobility management function entity or the storage function entity may be divided according to the foregoing method examples. For example, functional modules may be divided corresponding to functions, or two or more functions may be integrated into one processing module. The foregoing integrated module may be implemented in a hardware form or a software functional module form. It should be noted that module division in this application is an example and is merely logical function division. During actual implementation, there may be another division manner. For example, when the functional modules are divided corresponding to the functions, FIG. 15 is a schematic diagram of an apparatus. The apparatus may be the mobility management function entity or the storage function entity in the foregoing embodiments. The apparatus includes a processing unit 1501 and a communications unit 1502.

In one aspect, if the apparatus is the storage function entity, the communications unit 1502 is configured to receive a second key derivation algorithm, where the second key derivation algorithm is at least one key derivation algorithm that is received by the storage function entity and that is supported by a terminal. The processing unit 1501 is configured to: select a third key derivation algorithm from the second key derivation algorithm based on a preset policy, and generate a first message authentication code based on the second key derivation algorithm. The communications unit 1502 is further configured to send an authentication token to the terminal, where the authentication token includes the first message authentication code, the third key derivation algorithm, and the second key derivation algorithm.

Optionally, the second key derivation algorithm is carried in an authentication management field of the authentication token.

In another aspect, if the apparatus is the mobility management function entity or the storage function entity, the communications unit 1502 is configured to receive a first key derivation algorithm from a terminal, where the first key derivation algorithm is at least one key derivation algorithm supported by the terminal. The processing unit 1501 is configured to select a target key derivation algorithm from the first key derivation algorithm based on a preset policy. The processing unit 1501 is further configured to update a key stored in a network side node based on the target key derivation algorithm. The communications unit 1502 is further configured to send the target key derivation algorithm to the terminal.

Optionally, the processing unit 1501 is specifically configured to: generate a random number, and update the key stored in the network side node based on the random number and the target key derivation algorithm. The communications unit 1502 is further configured to send the random number to the terminal.

Optionally, if the apparatus is the mobility management function entity, the key stored in the mobility management function entity is an access security management entity key of the terminal. Alternatively, if the apparatus is the storage function entity, the key stored in the storage function entity is a first key used for communication between the terminal and the mobility management function entity.

Optionally, if the apparatus is the mobility management function entity, the communications unit 1502 is further configured to: receive a second key derivation algorithm, where the second key derivation algorithm is at least one key derivation algorithm that is received by the mobility management function entity and that is supported by the terminal; and send a non-access stratum NAS security mode complete SMP message to the terminal, where the NAS SMP message includes the second key derivation algorithm.

In this embodiment, the mobility management function entity or the storage function entity is represented in a form of dividing the functional modules corresponding to the functions, or the mobility management function entity or the storage function entity is represented in a form of integrating the functional modules. The "module" herein may refer to an application-specific integrated circuit (application-specific integrated circuit, ASIC), a circuit, a processor and a memory executing one or more software or firmware programs, an integrated logic circuit, and/or another device that can provide the foregoing functions.

It should be understood that, the mobility management function entity or the storage function entity may be configured to implement steps performed by the mobility management function entity or the storage function entity in the key derivation algorithm negotiation method according to the embodiments of the present invention.

For related features, refer to the description above. Details are not described herein again.

Figure 16:
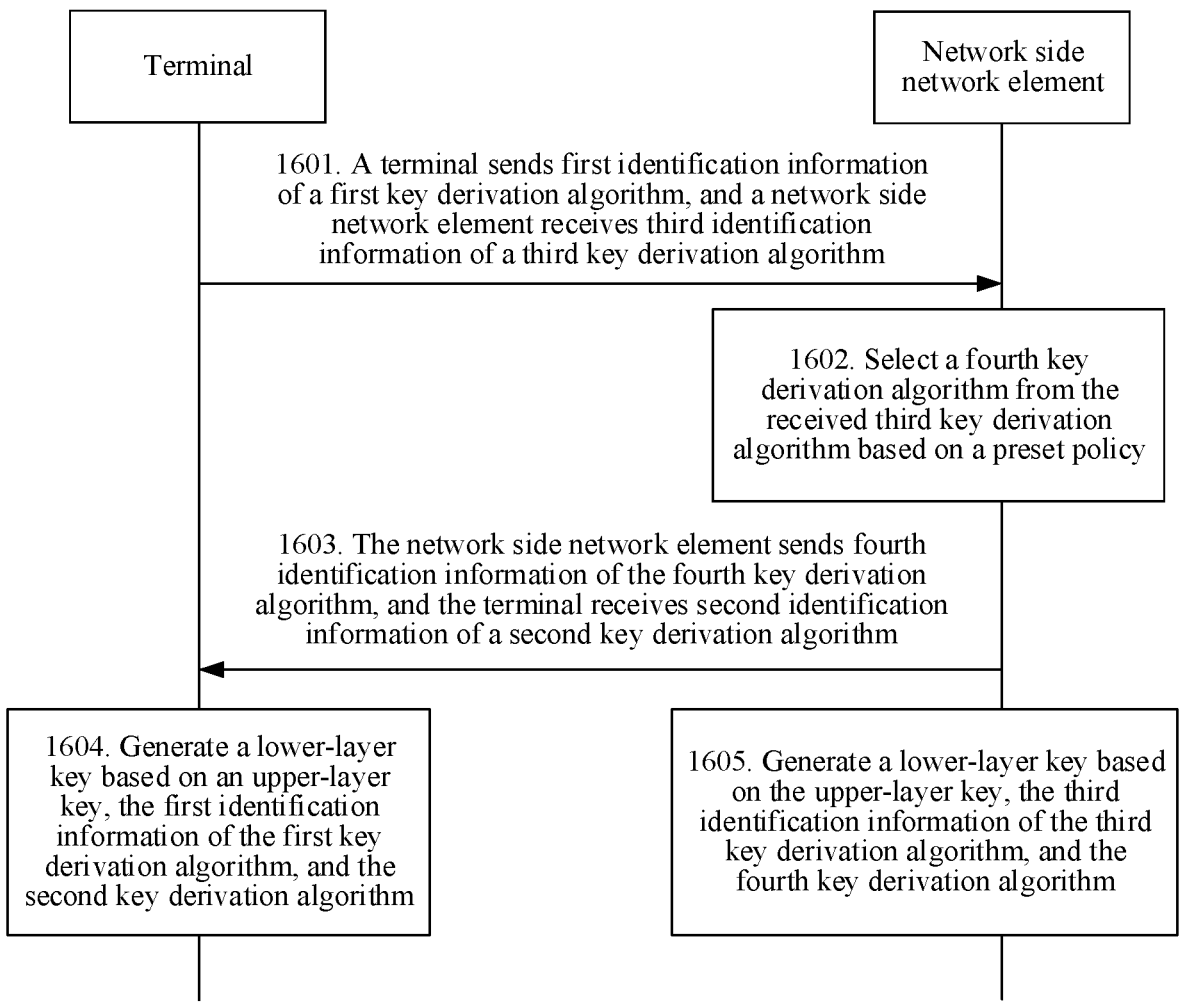
FIG. 16 shows another key derivation algorithm negotiation method according to an embodiment.

FIG. 16 shows another key derivation algorithm negotiation method according to this application. The method includes the following steps.

Step 1601. The terminal sends first identification information of a first key derivation algorithm to a network side network element, and the network side network element receives third identification information of a third key derivation algorithm.

The network side network element may be a UDM, an HSS, an AUSF, an SEAF, an AMF, an MME, a gNB, an eNB, or the like.

The first key derivation algorithm may be used to indicate capabilities of the key derivation algorithm of the terminal, that is, the first key derivation algorithm is at least one key derivation algorithm supported by the terminal. For example, the key derivation algorithms supported by the terminal are KDF1, KDF2, and KDF3, so that the first key derivation algorithm may be {KDF1, KDF2, KDF3}.

During specific implementation, the first key derivation algorithm sent by the terminal may be the first identification information of the key derivation algorithm that is supported by the terminal. For example, when the key derivation algorithms supported by the terminal are the KDF1, the KDF2, and the KDF3, the first identification information of the first key derivation algorithm sent by the terminal is {identifier of KDF1, identifier of KDF2, identifier of KDF3}.

In this application, the key derivation algorithm received by the network side network element and sent by the terminal is referred to as the third key derivation algorithm. During specific implementation, the network side network element receives identification information of the third key derivation algorithm. For example, the identification information is referred to as the third identification information.

Specific methods in which the terminal sends the first identification information of the first key derivation algorithm to the network side network element may be, for example, as follows.

When the network side network element is the AMF, that is, when the terminal negotiates with the AMF, the first identification information may be encapsulated in a registration request message (where the registration request message is used for initial registration of the terminal, for changing tracking area identity (tracking area identity, TAI), or for updating periodic TAI), and be sent to the AMF.

When the network side network element is the SEAF, that is, when the terminal negotiates with the SEAF, the first identification information may be first sent by the terminal to the AMF, and then sent by the AMF to the SEAF.

When the network side network element is the AUSF, that is, when the terminal negotiates with the AUSF, the first identification information may be first sent by the terminal to the SEAF through the AMF, and then sent by the SEAF to the AUSF by using an authentication initiation request (authentication initiation request) message (where the authentication initiation request message is used to initiate an authentication for the terminal).

When the network side network element is the UDM, that is, when the terminal negotiates with the UDM, the first identification information may be first sent by the terminal to the AUSF through the AMF and the SEAF, and then sent by the AUSF to the UDM by using an authentication information request (authentication information request) message (where the authentication information request message is used to request to authenticate a vector).

When the network side network element is the gNB, that is, when the terminal negotiates with the gNB, the first identification information may be first sent by the terminal to the AMF, and then sent by the AMF to the gNB by using an initial context setup request (initial context setup request) message (where the initial context setup request message is used for the setup of the initial terminal context).

When the network side network element is the MME, that is, when the terminal negotiates with the MME, the first identification information may be encapsulated in an attach request message (where the attach request message is used for the terminal registering to a network), and be sent to the MME.

When the network side network element is the HSS, that is, when the terminal negotiates with the HSS, the first identification information may be first sent by the terminal to the MME, and then sent by the MME to the HSS by using an authentication data request (authentication data request) message (where the authentication data request message is used to request to authenticate a vector).

When the network side network element is the eNB, that is, when the terminal negotiates with the eNB, the first identification information may be first sent by the terminal to the MME, and then sent by the MME to the eNB by using an initial context setup request (initial context setup request) message (where the initial context setup request message is used for the setup of the initial terminal context).

An initial message including the first identification information and sent by the terminal may be attacked by an attacker due to lack of the integrity protection, and the attacker may tamper with the first identification information in the initial message. In this case, the third identification information of the third key derivation algorithm received by the network side network element may be different from the first identification information of the first key derivation algorithm.

Alternatively, the first identification information sent by the terminal is not tampered with by the attacker, so that the third identification information of the third key derivation algorithm received by the network side network element is the same as the first identification information of the first key derivation algorithm sent by the terminal.

Therefore, the third identification information of the third key derivation algorithm received by the network side network element may be the same as, or may be different from, the first identification information of the first key derivation algorithm sent by the terminal.

Step 1602. The network side network element selects a fourth key derivation algorithm from the received third key derivation algorithm based on a preset policy.

The third key derivation algorithm is at least one key derivation algorithm received by the network side network element and supported by the terminal.

After receiving the third identification information of the third key derivation algorithm, the network side network element may determine the third key derivation algorithm based on the third identification information. Then the network side network element selects, based on the preset policy, one fourth key derivation algorithm from the third key derivation algorithm as a key derivation algorithm negotiated between the terminal and the network side network element.

The preset policy may be a priority policy, that is, a key derivation algorithm having a highest priority is selected; may be a quantity policy, that is, a key derivation algorithm used in a maximum quantity of times is selected; or may be another policy. This is not limited in this application.

For the purpose of convenient description, the following is described by using the priority policy as an example.

For example, the first key derivation algorithm is {KDF1, KDF2, KDF3}, and a priority of the KDF1 is lower than a priority of the KDF2, and the priority of the KDF2 is lower than a priority of the KDF3. If the first key derivation algorithm is not attacked and not tampered with, the third key derivation algorithm received by the network side network element is the same as the first key derivation algorithm, and is also the {KDF1, KDF2, KDF3}, so that the fourth key derivation algorithm selected by the network side network element from the third key derivation algorithm is the KDF3.

If the first key derivation algorithm is attacked and tampered with, (where the first key derivation algorithm is usually modified to a key derivation algorithm having only a lowest priority, to facilitate key cracking), for example, the third key derivation algorithm received by the network side network element is {KDF1}, so that the fourth key derivation algorithm selected by the network side network element from the third key derivation algorithm is the KDF1.

Step 1603. The network side network element sends fourth identification information of the fourth key derivation algorithm to the terminal, and the terminal receives second identification information of a second key derivation algorithm.

The network side network element selects one fourth key derivation algorithm from the third key derivation algorithm, and includes the fourth identification information of the fourth key derivation algorithm into a message and sends the message to the terminal. The message may be attacked by an attacker due to lack of the integrity protection, and the attacker may tamper with the fourth identification information in the message. In this case, the second identification information of the second key derivation algorithm received by the terminal may be different from the fourth identification information of the fourth key derivation algorithm.

Alternatively, the fourth identification information sent by the network side network element is not tampered with by the attacker, so that the second identification information of the second key derivation algorithm received by the terminal is the same as the fourth identification information of the fourth key derivation algorithm sent by the network side network element.

Therefore, the second identification information of the second key derivation algorithm received by the terminal may be the same as, or may be different from, the fourth identification information of the fourth key derivation algorithm sent by the network side network element.

After receiving the second identification information of the second key derivation algorithm, the terminal determines that the key derivation algorithm selected by the network side network element is the second key derivation algorithm. Alternatively, it may be understood that, the terminal determines that the key derivation algorithm that is negotiated with the network side is the second key derivation algorithm.

Step 1604. The terminal generates a lower-layer key based on an upper-layer key, the first identification information of the first key derivation algorithm, and the second key derivation algorithm.

That the terminal generates a lower-layer key based on an upper-layer key, the first identification information of the first key derivation algorithm, and the second key derivation algorithm specifically refers to that: the terminal uses the upper-layer key and the first identification information as input parameters, uses the second key derivation algorithm as a function, and inputs the input parameters to the function, to obtain the lower-layer key.

In another implementation, that the terminal generates a lower-layer key based on an upper-layer key, the first identification information, and the second key derivation algorithm may be that: the terminal generates the lower-layer key based on the upper-layer key, the first identification information, the second identification information, and the second key derivation algorithm, specifically referring to that: the terminal uses the upper-layer key, the first identification information, and the second identification information as input parameters, uses the second key derivation algorithm as a function, and inputs the input parameters to the function, to obtain the lower-layer key.

Descriptions are provided below with reference to specific examples.

For example, the network side network element is a mobility management function entity AMF, so that the upper-layer key may be an access management key Kamf, and the lower-layer key may be at least one of a non-access stratum encryption key KNASenc, a non-access stratum integrity protection key KNASint, a base station key KgNB, and a non-3GPP access key Kn3iwf. In other words, the terminal generates at least one of the lower-layer keys, that is, the KNASenc, the KNASint, the KgNB, and the Kn3iwf based on the upper-layer key Kamf, the first identification information, and the second key derivation algorithm. Alternatively, the terminal generates at least one of the lower-layer keys, that is, the KNASenc, the KNASint, the KgNB, and the Kn3iwf based on the upper-layer key Kamf, the first identification information, the second identification information, and the second key derivation algorithm.

For another example, the network side network element is a security anchor entity SEAF, so that the upper-layer key may be a security anchor key Kseaf, and the lower-layer key is a Kamf. In other words, the terminal generates the lower-layer key Kamf based on the upper-layer key Kseaf, the first identification information, and the second key derivation algorithm. Alternatively, the terminal generates the lower-layer key Kamf based on the upper-layer key Kseaf, the first identification information, the second identification information, and the second key derivation algorithm.

For another example, the network side network element is an authentication service entity AUSF, so that the upper-layer key may be an authentication service key Kausf, and the lower-layer key may be a Kseaf. In other words, the terminal generates the lower-layer key Kseaf based on the upper-layer key Kausf, the first identification information, and the second key derivation algorithm. Alternatively, the terminal generates the lower-layer key Kseaf based on the upper-layer key Kausf, the first identification information, the second identification information, and the second key derivation algorithm.

For another example, the network side network element is a united data management entity UDM, so that the upper-layer key may be a cipher key CK and an integrity key IK, and the lower-layer key may be at least one of a CK', an IK', and a Kausf. In other words, the terminal generates at least one of the lower-layer keys, that is, the CK', the IK', and the Kausf based on the upper-layer keys, that is, the CK and the IK, the first identification information, and the second key derivation algorithm. Alternatively, the terminal generates at least one of the lower-layer keys, that is, the CK', the IK', and the Kausf based on the upper-layer keys, that is, the CK and the IK, the first identification information, the second identification information, and the second key derivation algorithm.

For another example, the network side network element is a next generation NodeB gNB, so that the upper-layer key may be a KgNB, and the lower-layer key may be at least one of a radio connection control encryption key Krrc-enc, a radio connection control integrity protection key Krrc-int, a user plane encryption key Kup-enc, a user plane integrity protection key Kup-int, and a next hop NH. In other words, the terminal generates at least one of the lower-layer keys, that is, the Krrc-enc, the Krrc-int, the Kup-enc, the Kup-int, and the NH based on the upper-layer key KgNB, the first identification information, and the second key derivation algorithm. Alternatively, the terminal generates at least one of the lower-layer keys, that is, the Krrc-enc, the Krrc-int, the Kup-enc, the Kup-int, and the NH based on the upper-layer key KgNB, the first identification information, the second identification information, and the second key derivation algorithm.

For another example, the network side network element is a mobility management entity MME, so that the upper-layer key may be an access management key Kamse, and the lower-layer key may be at least one of a KNASenc and a KNASint. In other words, the terminal generates, based on the upper-layer key Kamse, the first identification information, and the second key derivation algorithm, at least one of the lower-layer keys, that is, the KNASenc and the KNAS-int. Alternatively, the terminal generates at least one of the lower-layer keys, that is, the KNASenc and the KNASint based on the upper-layer key Kamse, the first identification information, the second identification information, and the second key derivation algorithm.

For another example, the network side network element is an HSS, so that the upper-layer key may be a CK and an IK, and the lower-layer key may be a Kasme. In other words, the terminal generates the lower-layer key Kasme based on the upper-layer keys, that is, the CK and the IK, the first identification information, and the second key derivation algorithm. Alternatively, the terminal generates the lower-layer key Kasme based on the upper-layer keys, that is, the CK and the IK, the first identification information, the second identification information, and the second key derivation algorithm.

For another example, the network side network element is an eNB, so that the upper-layer key may be a KeNB, and the lower-layer key may be at least one of a Krrc-enc, a Krrc-int, a Kup-enc, a Kup-int, and an NH. In other words, the terminal generates at least one of the lower-layer keys, that is, the Krrc-enc, the Krrc-int, the Kup-enc, the Kup-int, and the NH based on the upper-layer key KeNB, the first identification information, and the second key derivation algorithm. Alternatively, the terminal generates at least one of the lower-layer keys, that is, the Krrc-enc, the Krrc-int, the Kup-enc, the Kup-int, and the NH based on the upper-layer key KeNB, the first identification information, the second identification information, and the second key derivation algorithm.

For another example, the network side network element is a UDM, the upper-layer key is a CK and an IK, and the lower-layer key is a Kseaf. In other words, the terminal generates a Kausf based on the CK, the IK, the first identification information, and the second key derivation algorithm; and then generates the Kseaf based on the Kausf and the second key derivation algorithm. Alternatively, the terminal generates a Kausf based on the CK, the IK, and the second key derivation algorithm, and then generates the Kseaf based on the Kausf, the first identification information, and the second key derivation algorithm. In this implementation, when negotiating the KDF algorithm with the UDM, the UE obtains a KDF algorithm that is used with the AUSF. In this way, two keys, that is, the Kausf and the Kseaf, are obtained in one negotiation between the terminal and the UDM. Therefore, the terminal does not need to separately negotiate the key derivation algorithm with the AUSF, so that overheads of the terminal may be reduced.

For another example, the network side network element is an AUSF, the upper-layer key is a CK and an IK, and the lower-layer key is a Kseaf. In other words, the terminal generates a Kausf based on the CK, the IK, the first identification information, and the second key derivation algorithm; and then generates the Kseaf based on the Kausf and the second key derivation algorithm. Alternatively, the terminal generates a Kausf based on the CK, the IK, and the second key derivation algorithm, and then generates the Kseaf based on the Kausf, the first identification information, and the second key derivation algorithm. In this implementation, when negotiating the KDF algorithm with the AUSF, the UE obtains a KDF algorithm that is used with the UDM. In this way, two keys, that is, the Kausf and the Kseaf, are obtained in one negotiation between the terminal and the AUSF. Therefore, the terminal does not need to separately negotiate the key derivation algorithm with the UDM, so that overheads of the terminal may be reduced.

For another example, the network side network element is an SEAF, the upper-layer key is a Kseaf, and the lower-layer key is at least one of a KNASenc, a KNASint, a KgNB, and a Kn3iwf. In other words, the terminal generates a Kamf based on the Kseaf, the first identification information, and the second key derivation algorithm, and then generates at least one of the KNASenc, the KNASint, the KgNB, and the Kn3iwf based on the Kamf and the second key derivation algorithm. Alternatively, the terminal generates a Kamf based on the Kseaf and the second key derivation algorithm, and then generates at least one of the KNASenc, the KNASint, the KgNB, and the Kn3iwf based on the Kamf, the first identification information, and the second key derivation algorithm. In this implementation, when negotiating the KDF algorithm with the SEAF, the UE obtains a KDF algorithm that is used with the AMF. In this way, two groups of keys are obtained in one negotiation between the terminal and the SEAF. The first group is the Kamf, and the second group is at least one of the KNASenc, the KNASint, the KgNB, and the Kn3iwf. Therefore, the terminal does not need to separately negotiate the key derivation algorithm with the AMF, so that overheads of the terminal may be reduced.

For another example, the network side network element is an AMF, the upper-layer key is a Kseaf, and the lower-layer key is at least one of a KNASenc, a KNASint, a KgNB, and a Kn3iwf. In other words, the terminal generates a Kamf based on the Kseaf, the first identification information, and the second key derivation algorithm, and then generates at least one of the KNASenc, the KNASint, the KgNB, and the Kn3iwf based on the Kamf and the second key derivation algorithm. Alternatively, the terminal generates a Kamf based on the Kseaf and the second key derivation algorithm, and then generates at least one of the KNASenc, the KNASint, the KgNB, and the Kn3iwf based on the Kamf, the first identification information, and the second key derivation algorithm. In this implementation, when negotiating the KDF algorithm with the AMF, the UE obtains a KDF algorithm that is used with the SEAF. In this way, two groups of keys are obtained in one negotiation between the terminal and the AMF. The first group is the Kamf, and the second group is at least one of the KNASenc, the KNASint, the KgNB, and the Kn3iwf. Therefore, the terminal does not need to separately negotiate the key derivation algorithm with the SEAF, so that overheads of the terminal may be reduced.

Step 1605. The network side network element generates a lower-layer key based on the upper-layer key, the third identification information of the third key derivation algorithm, and the fourth key derivation algorithm.

In this step, the network side network element generates the lower-layer key. Step 1605 may be performed before or after step 1604, or may be simultaneously performed with, step 1604.

In this step, the manner in which the network side network element generates the lower-layer key corresponds to the manner in which the terminal generates the lower-layer key. Specifically, if the terminal uses the upper-layer key and the first identification information as input parameters, uses the second key derivation algorithm as a function, and inputs the input parameters to the function, to obtain the lower-layer key, correspondingly, the network side network element uses the upper-layer key and the third identification information as input parameters, uses the fourth key derivation algorithm as a function, and inputs the input parameters to the function, to obtain the lower-layer key.

If the terminal uses the upper-layer key, the first identification information, and the second identification information as input parameters, uses the second key derivation algorithm as a function, and inputs the input parameters to the function, to obtain the lower-layer key, correspondingly, the network side network element uses the upper-layer key, the third identification information, and the fourth identification information as input parameters, uses the fourth key derivation algorithm as a function, and inputs the input parameters to the function, to obtain the lower-layer key.

For example, the network side network element is an AMF, the upper-layer key is a Kamf, and the lower-layer key is at least one of a KNASenc, a KNASint, a KgNB, and a Kn3iwf. In an implementation, the terminal generates at least one of the lower-layer keys, that is, the KNASenc, the KNASint, the KgNB, and the Kn3iwf based on the upper-layer key Kamf, the first identification information, and the second key derivation algorithm. Correspondingly, the AMF generates at least one of the lower-layer keys, that is, the KNASenc, the KNASint, the KgNB, and the Kn3iwf based on the upper-layer key Kamf, the third identification information, and the fourth key derivation algorithm. In another implementation, the terminal generates at least one of the lower-layer keys, that is, the KNASenc, the KNASint, the KgNB, and the Kn3iwf based on the upper-layer key Kamf, the first identification information, the second identification information, and the second key derivation algorithm. Correspondingly, the AMF generates at least one of the lower-layer keys, that is, the KNASenc, the KNASint, the KgNB, and the Kn3iwf based on the upper-layer key Kamf, the third identification information, the fourth identification information, and the fourth key derivation algorithm.

For cases in which the network side network element is the SEAF, the AUSF, the UDM, the gNB, the MME, the HSS, or the eNB, implementations are similar. Details are not described again.

In another implementation, when the network side network element is the UDM, the terminal may simultaneously complete KDF negotiation with the AUSF through one KDF negotiation with the UDM. In other words, the terminal may negotiate with the UDM, to obtain the Kausf and the Kseaf. Correspondingly, the UDM obtains, in the same manner as the terminal, the lower-layer key Kausf based on the upper-layer keys, that is, the CK and the IK, and further, the UDM further sends the fourth identification information and the Kausf to the AUSF, so that the AUSF generates the Kseaf based on the Kausf, the fourth identification information, and the fourth key derivation algorithm.

In another implementation, when the network side network element is the AUSF, the terminal may simultaneously complete KDF negotiation with the UDM through one KDF negotiation with the AUSF. In other words, the terminal may negotiate with the AUSF, to obtain the Kausf and the Kseaf Correspondingly, the AUSF first sends the fourth identification information to the UDM, the UDM obtains, in the same manner as the terminal, the lower-layer key Kausf based on the upper-layer keys, that is, the CK and the IK, and further, the UDM sends the Kausf to the AUSF, so that the AUSF generates the Kseaf based on the Kausf, the fourth identification information, and the fourth key derivation algorithm.

In another implementation, when the network side network element is the SEAF, the terminal may simultaneously complete KDF negotiation with the AMF through one KDF negotiation with the SEAF. In other words, the terminal may negotiate with the SEAF, to obtain the Kamf, and obtain at least one of the KNASenc, the KNASint, the KgNB, and the Kn3iwf. Correspondingly, the SEAF obtains, in the same manner as the terminal, the lower-layer key Kamf based on the upper-layer key Kseaf, and further, the SEAF further sends the fourth identification information and the Kamf to the AMF, so that the AMF generates at least one of the KNASenc, the KNASint, the KgNB, and the Kn3iwf based on the Kamf, the fourth identification information, and the fourth key derivation algorithm.

In another implementation, when the network side network element is the AMF, the terminal may simultaneously complete KDF negotiation with the SEAF through one KDF negotiation with the AMF. In other words, the terminal may negotiate with the AMF, to obtain the Kamf, and obtain at least one of the KNASenc, the KNASint, the KgNB, and the Kn3iwf Correspondingly, the AMF first sends the fourth identification information to the SEAF, the SEAF obtains, in the same manner as the terminal, the lower-layer key Kamf based on the upper-layer key Kseaf, and further, the SEAF further sends the Kamf to the AMF, so that the AMF generates at least one of the KNASenc, the KNASint, the KgNB, and the Kn3iwf based on the Kamf, the fourth identification information, and the fourth key derivation algorithm.

In the implementations by performing step 1601 to step 1605, there are following several cases.

Case 1: The first key derivation algorithm is the same as the third key derivation algorithm, and the second key algorithm is the same as the fourth key derivation algorithm.

In this case, the first key derivation algorithm sent by the terminal to the network side network element is the same as the third key derivation algorithm received by the network side network element, and the second key derivation algorithm received by the terminal is the same as the fourth key derivation algorithm sent by the network side network element. That is, the first key derivation algorithm sent by the terminal is not tampered with, and the fourth key derivation algorithm sent by the network side network element is also not tampered with. In this case, the lower-layer keys generated through negotiation between the terminal and the network side network element are the same, so that normal communication may be implemented.

Case 2: The first key derivation algorithm is the same as the third key derivation algorithm. However, the second derivation algorithm is different from the fourth key derivation algorithm.

In this case, the first key derivation algorithm sent by the terminal to the network side network element is the same as the third key derivation algorithm received by the network side network element, and the second key derivation algorithm received by the terminal is different from the fourth key derivation algorithm sent by the network side network element. That is, the first key derivation algorithm sent by the terminal is not tampered with. However, the fourth key derivation algorithm sent by the network side network element is tampered with. In this case, the lower-layer keys generated through negotiation between the terminal and the network side network element are different, so that the terminal subsequently cannot be in normal communication with the network side network element. That is, the terminal and the network side network element may find the negotiation a failure, and may further initiate the negotiation process again. In other words, in this case, when the key derivation algorithm is tampered with, the terminal and the network side network element may not communicate by using the key that is generated based on the tampered key derivation algorithm, so that communication security may be ensured.

Case 3: The first key derivation algorithm is different from the third key derivation algorithm. However, the second key algorithm is the same as the fourth key derivation algorithm.

In this case, the first key derivation algorithm sent by the terminal to the network side network element is different from the third key derivation algorithm received by the network side network element, and the second key derivation algorithm received by the terminal is the same as the fourth key derivation algorithm sent by the network side network element. That is, the first key derivation algorithm sent by the terminal is tampered with. However, the fourth key derivation algorithm sent by the network side network element is not tampered with. In this case, the lower-layer keys generated through negotiation between the terminal and the network side network element are different, so that the terminal subsequently cannot be in normal communication with the network side network element. That is, the terminal and the network side network element may find the negotiation a failure, and may further initiate the negotiation process again. In other words, in this case, when the key derivation algorithm is tampered with, the terminal and the network side network element may not communicate by using the key that is generated based on the tampered key derivation algorithm, so that communication security may be ensured.

Case 4: The first key derivation algorithm is different from the third key derivation algorithm, and the second key algorithm is different from the fourth key derivation algorithm.

In this case, the first key derivation algorithm sent by the terminal to the network side network element is different from the third key derivation algorithm received by the network side network element, and the second key derivation algorithm received by the terminal is different from the fourth key derivation algorithm sent by the network side network element. That is, the first key derivation algorithm sent by the terminal is tampered with, and the fourth key derivation algorithm sent by the network side network element is tampered with. In this case, the lower-layer keys generated through negotiation between the terminal and the network side network element are different, so that the terminal subsequently cannot be in normal communication with the network side network element. That is, the terminal and the network side network element may find the negotiation a failure, and may further initiate the negotiation process again. In other words, in this case, when the key derivation algorithm is tampered with, the terminal and the network side network element may not communicate by using the key that is generated based on the tampered key derivation algorithm, so that communication security may be ensured.

Therefore, according to the method provided in this application, if the key derivation algorithm is tampered with, the terminal and the network side network element may generate different lower-layer keys, resulting in a communication failure. Therefore, when the key derivation algorithm is tampered with, the terminal and the network side network element may not communicate by using the key that is generated based on the tampered key derivation algorithm, so that the communication security may be ensured.

The key negotiation method shown in FIG. 16 is described by using an example below with reference to specific embodiments.

Figure 17A:
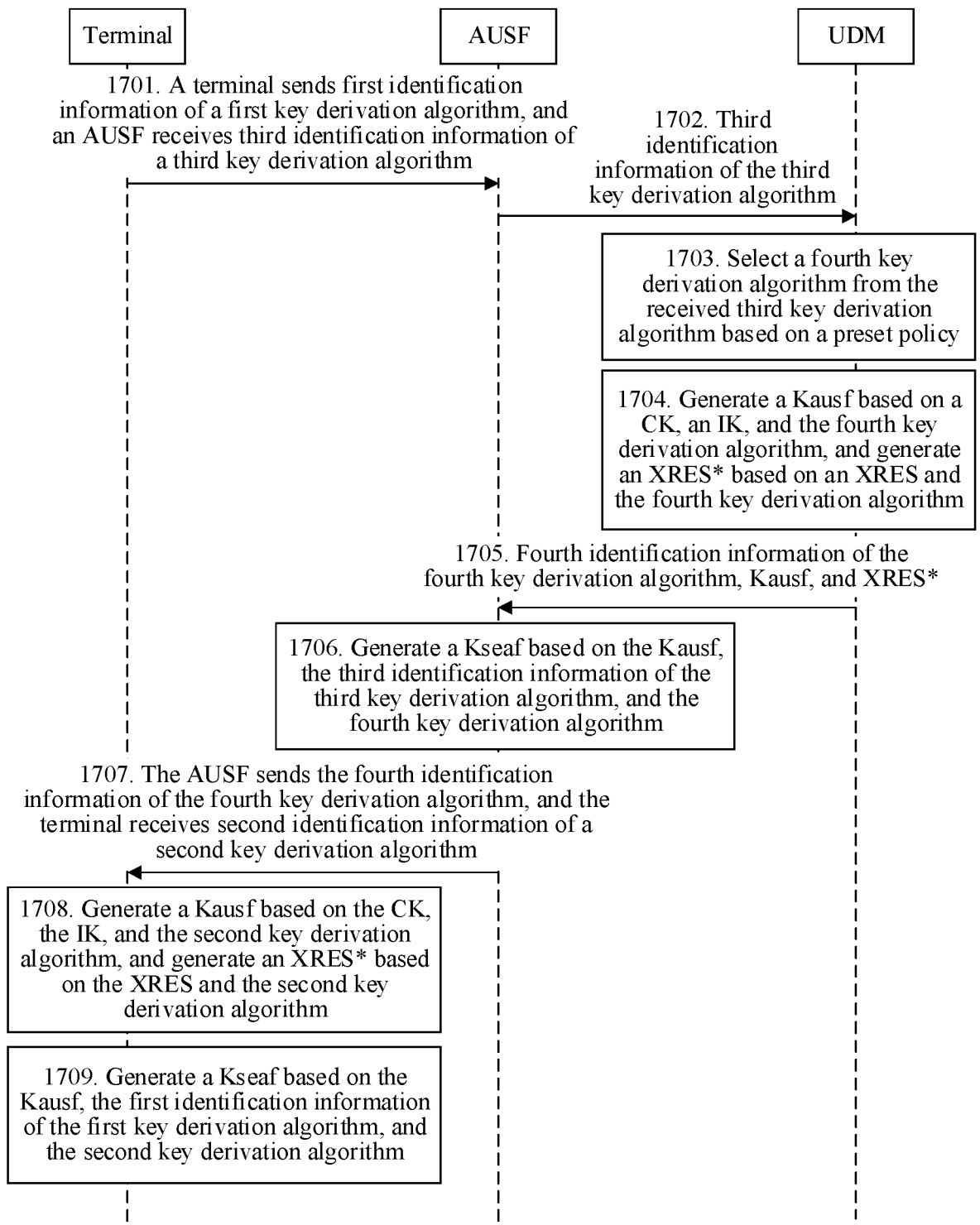
FIG. 17(a) shows another key derivation algorithm negotiation method according to an embodiment.

FIG. 17(a) shows another key negotiation method according to this application. The method includes the following steps.

Step 1701. The terminal sends first identification information of a first key derivation algorithm to an AUSF, and the AUSF receives third identification information of a third key derivation algorithm.

The first key derivation algorithm may be used to indicate capabilities of the key derivation algorithm of the terminal, that is, the first key derivation algorithm is at least one key derivation algorithm supported by the terminal. The third key derivation algorithm indicates the capabilities of the key derivation algorithm that is of the terminal and that is received by the AUSF.

In an implementation, the first identification information may be sent by the terminal to the AUSF through an AMF and an SEAF.

Step 1702. The AUSF sends the third identification information of the third key derivation algorithm to a UDM, and the UDM receives the third identification information of the third key derivation algorithm.

For example, the AUSF sends the third identification information to the UDM by using an authentication information request (authentication information request) message.

It should be noted that, because the message is integrity protected in the step, the third identification information sent by the AUSF to the UDM is not tampered with.

Step 1703. The UDM selects a fourth key derivation algorithm from the received third key derivation algorithm based on a preset policy.

An implementation of the step is the same as the method in which the network side network element selects the fourth key algorithm in step 1602 according to the embodiment shown in FIG. 16. For the implementation, refer to the foregoing description.

Step 1704. The UDM generates a Kausf based on a CK, an IK, and the fourth key derivation algorithm, and generates an XRES* based on an XRES and the fourth key derivation algorithm.

In one aspect, the UDM uses the CK and the IK as input parameters, uses the fourth key derivation algorithm as a function, and inputs the input parameters to the function, to obtain the key Kausf. Optionally, the input parameters may further include fourth identification information of the fourth key derivation algorithm.

In another aspect, the UDM further uses the XRES as an input parameter, uses the fourth key derivation algorithm as a function, and inputs the input parameter to the function, to obtain the XRES*. Optionally, the input parameter may further include the fourth identification information of the fourth key derivation algorithm.

Step 1705. The UDM sends fourth identification information of the fourth key derivation algorithm, the Kausf, and the XRES* to the AUSF, and correspondingly, the AUSF receives the fourth identification information of the fourth key derivation algorithm, the Kausf, and the XRES*.

It should be noted that, because the message is integrity protected in the step, the fourth identification information of the fourth key derivation algorithm, the Kausf, and the XRES* that are sent by the UDM to the AUSF are not tampered with.

Step 1706. The AUSF generates a Kseaf based on the Kausf, the third identification information of the third key derivation algorithm, and the fourth key derivation algorithm.

The AUSF uses the Kausf and the third identification information as input parameters, uses the fourth key derivation algorithm as a function, and inputs the input parameters to the function, to obtain the Kseaf Optionally, the input parameters may further include the fourth identification information of the fourth key derivation algorithm.

Step 1707. The AUSF sends the fourth identification information of the fourth key derivation algorithm to the terminal, and the terminal receives second identification information of a second key derivation algorithm.

The fourth key derivation algorithm is one algorithm selected by the UDM from the third key derivation algorithm, and the second key derivation algorithm is a key derivation algorithm received by the terminal when the AUSF sends the fourth key derivation algorithm to the terminal.

When the fourth identification information of the fourth key derivation algorithm is not tampered with by an attacker, the second identification information received by the terminal is the same as the fourth identification information sent by the AUSF. When the fourth identification information of the fourth key derivation algorithm is tampered with by the attacker, the second identification information received by the terminal may be different from the fourth identification information sent by the AUSF.

Step 1708. The terminal generates a Kausf based on the CK, the IK, and the second key derivation algorithm, and generates an XRES* based on the XRES and the second key derivation algorithm.

In one aspect, the terminal uses the CK and the IK as input parameters, uses the second key derivation algorithm as a function, and inputs the input parameters to the function, to obtain the key Kausf Optionally, the input parameters may further include the second identification information of the second key derivation algorithm.

In another aspect, the terminal further uses the XRES as an input parameter, uses the second key derivation algorithm as a function, and inputs the input parameter to the function, to obtain the XRES*. Optionally, the input parameter may further include the second identification information of the second key derivation algorithm.

It may be learned that, a difference between generating the Kausf by the terminal and generating the Kausf by the UDM lies in that: the function on the UDM side is the fourth key derivation algorithm, and the input parameter on the terminal side is the second key derivation algorithm. Therefore, if the second key derivation algorithm is the same as the fourth key derivation algorithm, the Kausf generated by the terminal is the same as the Kausf generated by the UDM.

Similarly, a difference between generating the XRES* by the terminal and generating the XRES* by the UDM lies in that: the function on the UDM side is the fourth key derivation algorithm, and the input parameter on the terminal side is the second key derivation algorithm. Therefore, if the second key derivation algorithm is the same as the fourth key derivation algorithm, the XRES* generated by the terminal is the same as the XRES* generated by the UDM.

Step 1709. The terminal generates a Kseaf based on the Kausf, the first identification information of the first key derivation algorithm, and the second key derivation algorithm.

The terminal uses the Kausf and the first identification information as input parameters, uses the second key derivation algorithm as a function, and inputs the input parameters to the function, to obtain the Kseaf Optionally, the input parameters may further include the second identification information of the second key derivation algorithm.

It may be learned that, a difference between generating the Kseaf by the terminal and generating the Kseaf by the AUSF lies in that: the function on the AUSF side is the fourth key derivation algorithm and the input parameter includes the third identification information, and the function on the terminal side is the second key derivation algorithm and the input parameter includes the first identification information. Therefore, if the second key derivation algorithm is the same as the fourth key derivation algorithm, and the first key derivation algorithm is the same as the third key derivation algorithm, the Kseaf generated by the terminal is the same as the Kseaf generated by the AUSF.

It may be learned from the process in which the terminal negotiates the key with the UDM that: First, only when the first key derivation algorithm is the same as the third key derivation algorithm, and the second key derivation algorithm is the same as the fourth key derivation algorithm, the Kseafs generated by the terminal and the AUSF through the negotiation are the same, and if the Kseafs are different, the normal communication cannot be completed, so that the security of the key is ensured while the key negotiation is completed. Second, from a perspective of the terminal, the terminal may simultaneously complete the KDF negotiation with the AUSF through one KDF negotiation with the UDM. In other words, the terminal may negotiate with the UDM, to obtain the Kausf and the Kseaf.

It may be learned from the process in which the terminal negotiates the key with the AUSF that: First, only when the first key derivation algorithm is the same as the third key derivation algorithm, and the second key derivation algorithm is the same as the fourth key derivation algorithm, the Kseafs generated by the terminal and the AUSF through the negotiation are the same, and if the Kseafs are different, the normal communication cannot be completed, so that the security of the key is ensured while the key negotiation is completed. Second, from a perspective of the terminal, the terminal may simultaneously complete the KDF negotiation with the UDM through one KDF negotiation with the AUSF. In other words, the terminal may negotiate with the AUSF, to obtain the Kausf and the Kseaf.

Figure 17B:
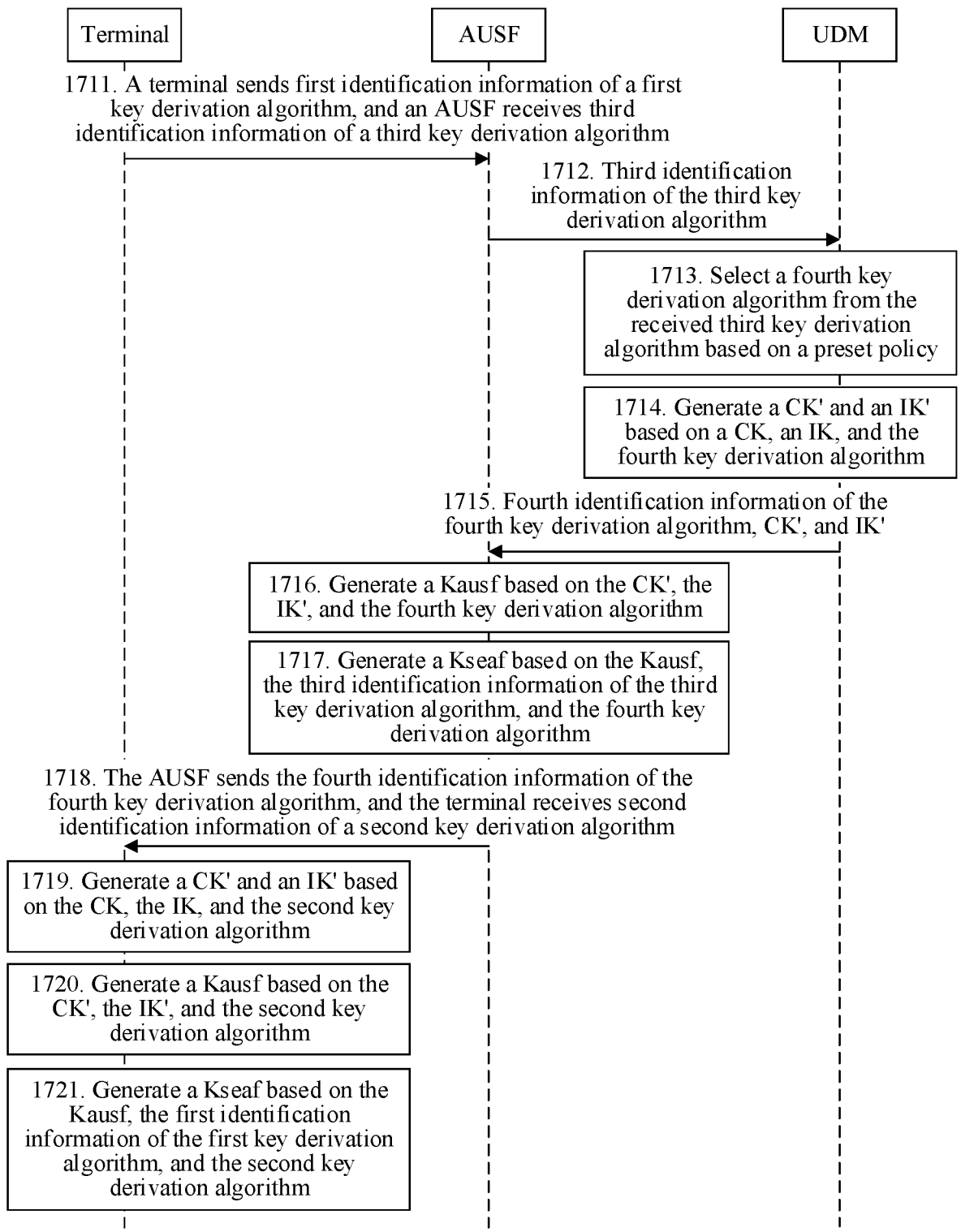
FIG. 17(b) shows another key derivation algorithm negotiation method according to an embodiment.

FIG. 17(*b*) shows another key negotiation method according to this application. The method includes the following steps.

Step 1711. The terminal sends first identification information of a first key derivation algorithm to an AUSF, and the AUSF receives third identification information of a third key derivation algorithm.

The first key derivation algorithm may be used to indicate capabilities of the key derivation algorithm of the terminal, that is, the first key derivation algorithm is at least one key derivation algorithm supported by the terminal. The third key derivation algorithm indicates the capabilities of the key derivation algorithm that is of the terminal and that is received by the AUSF.

In an implementation, the first identification information may be sent by the terminal to the AUSF through an AMF and an SEAF.

Step 1712. The AUSF sends the third identification information of the third key derivation algorithm to a UDM, and the UDM receives the third identification information of the third key derivation algorithm.

For example, the AUSF sends the third identification information to the UDM by using an authentication information request (authentication information request) message.

It should be noted that, because the message is integrity protected in the step, the third identification information sent by the AUSF to the UDM is not tampered with.

Step 1713. The UDM selects a fourth key derivation algorithm from the received third key derivation algorithm based on a preset policy.

An implementation of the step is the same as the method in which the network side network element selects the fourth key algorithm in step 1602 according to the embodiment shown in FIG. 16. For the implementation, refer to the foregoing description.

Step 1714. The UDM generates a CK' and an IK' based on a CK, an IK, and the fourth key derivation algorithm.

The UDM uses the CK and the IK as input parameters, uses the fourth key derivation algorithm as a function, and inputs the input parameters to the function, to obtain the CK' and the IK'. Optionally, the input parameters may further include fourth identification information of the fourth key derivation algorithm.

Step 1715. The UDM sends fourth identification information of the fourth key derivation algorithm, the CK', and the IK' to the AUSF, and correspondingly, the AUSF receives the fourth identification information of the fourth key derivation algorithm, the CK', and the IK'.

It should be noted that, because the message is integrity protected in the step, the fourth identification information of the fourth key derivation algorithm, the CK', and the IK' that are sent by the UDM to the AUSF are not tampered with.

Step 1716. The AUSF generates a Kausf based on the CK', the IK', and the fourth key derivation algorithm.

The AUSF uses the CK' and the IK' as input parameters, uses the fourth key derivation algorithm as a function, and inputs the input parameters to the function, to obtain the Kausf. Optionally, the input parameters may further include the fourth identification information of the fourth key derivation algorithm.

Step 1717. The AUSF generates a Kseaf based on the Kausf, the third identification information of the third key derivation algorithm, and the fourth key derivation algorithm.

The AUSF uses the Kausf and the third identification information as input parameters, uses the fourth key derivation algorithm as a function, and inputs the input parameters to the function, to obtain the Kseaf Optionally, the input parameters may further include the fourth identification information of the fourth key derivation algorithm.

Step 1718. The AUSF sends the fourth identification information of the fourth key derivation algorithm to the terminal, and the terminal receives second identification information of a second key derivation algorithm.

The fourth key derivation algorithm is one algorithm selected by the UDM from the third key derivation algorithm, and the second key derivation algorithm is a key derivation algorithm received by the terminal when the AUSF sends the fourth key derivation algorithm to the terminal.

When the fourth identification information of the fourth key derivation algorithm is not tampered with by an attacker, the second identification information received by the terminal is the same as the fourth identification information sent by the AUSF. When the fourth identification information of the fourth key derivation algorithm is tampered with by the attacker, the second identification information received by the terminal may be different from the fourth identification information sent by the AUSF.

Step 1719. The terminal generates a CK' and an IK' based on the CK, the IK, and the second key derivation algorithm.

The terminal uses the CK' and the IK' as input parameters, uses the second key derivation algorithm as a function, and inputs the input parameters to the function, to obtain the CK' and IK'. Optionally, if the input parameter in step 1714 includes the fourth identification information of the fourth key derivation algorithm, the input parameter in step 1719 further includes the second identification information of the second key derivation algorithm.

Step 1720. The terminal generates a Kausf based on the CK', the IK', and the second key derivation algorithm.

The terminal uses the CK' and the IK' as input parameters, uses the second key derivation algorithm as a function, and inputs the input parameters to the function, to obtain the key Kausf. Optionally, if the input parameter in step 1716 includes the fourth identification information of the fourth key derivation algorithm, the input parameter in step 1720 further includes the second identification information of the second key derivation algorithm.

It may be learned that, a difference between generating the Kausf by the terminal and generating the Kausf by the AUSF lies in that: the function on the AUSF side is the fourth key derivation algorithm, and the function on the terminal side is the second key derivation algorithm. Therefore, if the second key derivation algorithm is the same as the fourth key derivation algorithm, the Kausf generated by the terminal is the same as the Kausf generated by the AUSF.

Step 1721. The terminal generates a Kseaf based on the Kausf, the first identification information of the first key derivation algorithm, and the second key derivation algorithm.

The terminal uses the Kausf and the first identification information as input parameters, uses the second key derivation algorithm as a function, and inputs the input parameters to the function, to obtain the Kseaf. Optionally, if the input parameter in step 1717 includes the fourth identification information of the fourth key derivation algorithm, the input parameter in step 1721 further includes the second identification information of the second key derivation algorithm.

It may be learned that, a difference between generating the Kseaf by the terminal and generating the Kseaf by the AUSF lies in that: the function on the AUSF side is the fourth key derivation algorithm and the input parameter includes the third identification information, and the function on the terminal side is the second key derivation algorithm and the input parameter includes the first identification information. Therefore, if the second key derivation algorithm is the same as the fourth key derivation algorithm, and the first key derivation algorithm is the same as the third key derivation algorithm, the Kseaf generated by the terminal is the same as the Kseaf generated by the AUSF.

It may be learned from the process in which the terminal negotiates the key with the UDM that: First, only when the first key derivation algorithm is the same as the third key derivation algorithm, and the second key derivation algorithm is the same as the fourth key derivation algorithm, the Kseafs generated by the terminal and the AUSF through the negotiation are the same, and if the Kseafs are different, the normal communication cannot be completed, so that the security of the key is ensured while the key negotiation is completed. Second, from a perspective of the terminal, the terminal may simultaneously complete the KDF negotiation with the AUSF through one KDF negotiation with the UDM. In other words, the terminal may negotiate with the UDM, to obtain the Kausf and the Kseaf.

It may be learned from the process in which the terminal negotiates the key with the AUSF that: First, only when the first key derivation algorithm is the same as the third key derivation algorithm, and the second key derivation algorithm is the same as the fourth key derivation algorithm, the Kseafs generated by the terminal and the AUSF through the negotiation are the same, and if the Kseafs are different, the normal communication cannot be completed, so that the security of the key is ensured while the key negotiation is completed. Second, from a perspective of the terminal, the terminal may simultaneously complete the KDF negotiation with the UDM through one KDF negotiation with the AUSF. In other words, the terminal may negotiate with the AUSF, to obtain the Kausf and the Kseaf.

Figure 18:
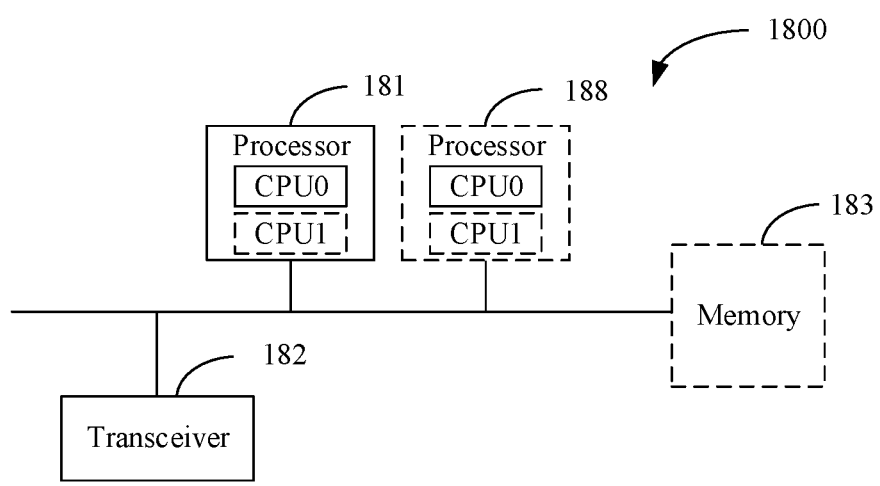
FIG. 18 is a schematic diagram of another apparatus according to an embodiment.

Based on same inventive ideas, FIG. 18 is a schematic diagram of an apparatus according to this application. The apparatus may be a terminal, and may perform the method performed by the terminal according to the embodiment shown in FIG. 16, or may be a network side network element, and may perform the method performed by the network side network element according to the embodiment shown in FIG. 16.

The apparatus 1800 includes at least one processor 181 and a transceiver 182, and optionally, further includes a memory 183. The processor 181, the transceiver 182, and the memory 183 are connected by using a communications bus.

The processor 181 may be one general purpose central processing unit (CPU), a microprocessor, an ASIC, or one or more integrated circuits configured to control execution of a program in the solutions of the present invention.

The communications bus may include a path for transmitting information between the foregoing units.

The transceiver 182 is configured to communicate with another device or communications network, and the transceiver includes a radio frequency circuit.

The memory 183 may be a ROM or another type of static storage device that can store static information and an instruction; or a RAM or another type of dynamic storage device that can store information and an instruction; or may be an EEPROM, a CD-ROM or another compact-disc storage medium, optical disc storage medium (including a compact disc, a laser disk, an optical disc, a digital versatile disc, a Blu-ray disc, or the like), a magnetic disk storage medium or another magnetic storage device, or any other medium that can be configured to carry or store expected program code in a form of an instruction or a data structure and that is accessible by a computer, but is not limited thereto. The memory 183 may independently exist and is connected to the processor 181 by using the communications bus. The memory 183 may alternatively be integrated with the processor. The memory 183 is configured to store application program code for performing this solution of the present invention, and the processor 181 controls the performing. The processor 181 is configured to execute the application program code stored in the memory 183.

During specific implementation, in an embodiment, the processor 181 may include one or more CPUs, for example, a CPU0 and a CPU1 in FIG. 18.

During specific implementation, in an embodiment, the apparatus 1800 may include a plurality of processors, for example, a processor 181 and a processor 188 in FIG. 18. Each of the processors may be a single-core (single-CPU) processor, or may be a multi-core (multi-CPU) processor. The processor herein may refer to one or more devices, circuits, and/or processing cores configured to process data (such as a computer program instruction).

It should be understood that, when the apparatus is a terminal, the terminal may be configured to implement steps performed by the terminal in the key derivation algorithm negotiation method according to the embodiment shown in FIG. 16. For related features, refer to the description above. Details are not described herein again. When the apparatus is a network side network element, the network side network element may be configured to implement steps performed by the network side network element in the key derivation algorithm negotiation method according to the embodiment shown in FIG. 16. For related features, refer to the description above. Details are not described herein again.

Figure 19:
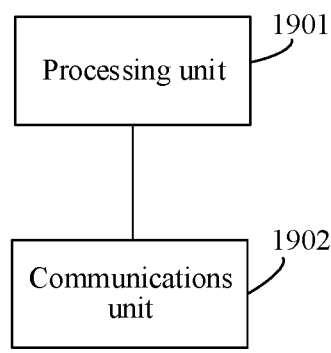
FIG. 19 is a schematic diagram of another apparatus according to an embodiment.

In this application, the foregoing apparatus may be divided into functional modules based on the foregoing method examples. For example, the functional modules may be divided corresponding to the functions, or two or more functions may be integrated into one processing module. The foregoing integrated module may be implemented in a hardware form or a software functional module form. It should be noted that module division in this application is an example and is merely logical function division. During actual implementation, there may be another division manner. For example, when the functional modules are divided corresponding to the functions, FIG. 19 is a schematic diagram of an apparatus. The apparatus includes a processing unit 1901 and a communications unit 1902.

In an embodiment, the apparatus may be the terminal included in the embodiment shown in FIG. 16. When the apparatus is the terminal, the processing unit 1901 and the communications unit 1902 of the apparatus may be configured to perform the following operations:

the communications unit 1902 is configured to send first identification information of a first key derivation algorithm to a network side network element, where the first key derivation algorithm is at least one key derivation algorithm supported by the terminal;

the communications unit 1902 is further configured to receive second identification information of a second key derivation algorithm; and the processing unit 1901 is configured to generate a lower-layer key based on an upper-layer key, the first identification information, and the second key derivation algorithm.

Optionally, the processing unit 1901 is specifically configured to generate the lower-layer key based on the upper-layer key, the first identification information, the second identification information, and the second key derivation algorithm.

Optionally, the upper-layer key is a cipher key CK and an integrity key IK, and the lower-layer key is a security anchor key Kseaf; and the processing unit 1901 is specifically configured to: generate an authentication service key Kausf based on the CK, the IK, the first identification information, and the second key derivation algorithm, and generate the Kseaf based on the Kausf and the second key derivation algorithm; or generate a Kausf based on the CK, the IK, and the second key derivation algorithm, and generate the Kseaf based on the Kausf, the first identification information, and the second key derivation algorithm.

Optionally, the upper-layer key is a Kseaf, and the lower-layer key is at least one of a non-access stratum encryption key KNASenc, a non-access stratum integrity protection key KNASint, a base station key KgNB, and a non-3GPP access key Kn3iwf; and the processing unit 1901 is specifically configured to: generate an access management key Kamf based on the Kseaf, the first identification information, and the second key derivation algorithm, and generate at least one of the KNASenc, the KNASint, the KgNB, and the Kn3iwf based on the Kamf and the second key derivation algorithm; or generate a Kamf based on the Kseaf and the second key derivation algorithm, and generate at least one of the KNASenc, the KNASint, the KgNB, and the Kn3iwf based on the Kamf, the first identification information, and the second key derivation algorithm.

It should be understood that, the terminal may be configured to implement steps performed by the terminal in the key derivation algorithm negotiation method according to the embodiment shown in FIG. 16. For related features, refer to the description above. Details are not described herein again.

In another embodiment, the apparatus may be the network side network element included in the embodiment shown in FIG. 16. When the apparatus is the network side network element, the processing unit 1901 and the communications unit 1902 of the apparatus may be configured to perform the following operations:

the communications unit 1902 is configured to receive third identification information of a third key derivation algorithm, where the third key derivation algorithm is at least one key derivation algorithm that is received by the network side network element and that is supported by a terminal;

the processing unit 1901 is configured to: select a fourth key derivation algorithm from the third key derivation algorithm based on a preset policy; and generate a lower-layer key based on the third identification information, the fourth key derivation algorithm, and an upper-layer key; and the communications unit 1902 is further configured to send fourth identification information of the fourth key derivation algorithm to the terminal.

Optionally, the processing unit 1901 is specifically configured to generate the lower-layer key based on the upper-layer key, the third identification information, the fourth identification information, and the fourth key derivation algorithm.

Optionally, the apparatus 1900 is a unified data management entity, the upper-layer key is a CK and an IK, and the lower-layer key is a Kausf; and the communications unit 1902 is further configured to send fourth identification information and the Kausf to an authentication service entity.

Optionally, the apparatus 1900 is a security anchor entity, the upper-layer key is a Kseaf, and the lower-layer key is a Kamf; and the communications unit 1902 is further configured to send fourth identification information and the Kamf to a mobility management function entity.

It should be understood that, the network side network element may be configured to implement steps performed by the network side network element in the key derivation algorithm negotiation method according to the embodiment shown in FIG. 16 in the present invention. For related features, refer to the description above. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk, (SSD)), or the like.

Although the present invention is described with reference to the embodiments, in a process of implementing the present invention that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of a plurality. A single processor or another unit may implement several functions enumerated in the claims. The fact that some measures are recited in mutually different dependent claims does not indicate that a combination of these measures cannot bring better effects.

A person skilled in the art should understand that the embodiments of this application may be provided as a method, an apparatus (device), a computer-readable storage medium, or a computer program product. Therefore, this application may use a form of hardware only embodiments, software only embodiments, or embodiments with a combination of software and hardware. They are collectively referred to as "modules" or "systems".

This application is described with reference to the flowcharts and/or block diagrams of the method, the apparatus (device), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing.

Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, apparently, various modifications and combinations may be made to them without departing from the spirit and scope of the present invention. Correspondingly, the specification and accompanying drawings are merely examples of description of the present invention defined by the accompanying claims, and are considered as any of or all modifications, variations, combinations or equivalents that cover the scope of the present invention. Obviously, a person skilled in the art may make various modifications and variations to the present invention without departing from the spirit and scope of the present invention. In this case, the present invention is intended to cover these modifications and variations provided that they fall within the scope defined by the claims and their equivalent technologies of the present invention.

What is claimed is:

1. A cryptographic key generation method, comprising:
   sending, by an apparatus, first identification information of a first key derivation algorithm to a network side network element, wherein the first key derivation algorithm is at least one key derivation algorithm supported by the terminal;
   receiving, by the apparatus, second identification information of a second key derivation algorithm and third identification information of a third key derivation algorithm, wherein the second key derivation algorithm is a key derivation algorithm selected by the network side network element and the third key derivation algorithm is a key derivation algorithm received by the network side network element;
   checking, by the apparatus, whether the first identification information is not modified based on the third identification information; and
   generating, by the apparatus in response to that the first identification information is not modified, an authentication service key (Kausf) based on a cipher key (CK), an integrity key (IK), and the second key derivation algorithm, and generating a security anchor key (Kseaf) based on the Kausf and the second key derivation algorithm.

2. An apparatus, comprising one or more hardware processors and a communication interface, wherein
   the one or more hardware processors are configured to send, through the communication interface, first identification information of a first key derivation algorithm to a network side network element, wherein the first key derivation algorithm is at least one key derivation algorithm supported by a terminal;
   the one or more hardware processors are further configured to receive, through the communication interface, second identification information of a second key derivation algorithm and third identification information of a third key derivation algorithm, wherein the second key derivation algorithm is a key derivation algorithm selected by the network side network element and the third key derivation algorithm is a key derivation algorithm received by the network side network element; and
   the one or more hardware processors are further configured to check, by the terminal, whether the first identification information is not modified based on the third identification information, and generate, by the apparatus in response to that the first identification information is not modified, an authentication service key (Kausf) based on a cipher key (CK), an integrity key (IK), and the second key derivation algorithm, and generate the a security anchor key (Kseaf) based on the Kausf and the second key derivation algorithm.

* * * * *

UNITED STATES PATENT AND TRADEMARK OFFICE
CERTIFICATE OF CORRECTION

PATENT NO. : 11,627,458 B2
APPLICATION NO. : 16/821103
DATED : April 11, 2023
INVENTOR(S) : Li Hu et al.

It is certified that error appears in the above-identified patent and that said Letters Patent is hereby corrected as shown below:

In the Claims

In Column 58, Line 36, in Claim 2, after "the a" insert -- a --.

Signed and Sealed this
Fourth Day of July, 2023

Katherine Kelly Vidal
*Director of the United States Patent and Trademark Office*